(12) United States Patent
Yan et al.

(10) Patent No.: US 10,853,345 B2
(45) Date of Patent: *Dec. 1, 2020

(54) INCREMENTAL CLUSTERING OF DATABASE TABLES

(71) Applicant: Snowflake Inc., San Mateo, CA (US)

(72) Inventors: Jiaqi Yan, San Mateo, CA (US); Thierry Cruanes, San Mateo, CA (US); Jeffrey Rosen, San Mateo, CA (US); William Waddington, San Mateo, CA (US); Prasanna Rajaperumal, San Mateo, CA (US); Abdul Munir, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,989

(22) Filed: Dec. 17, 2019

(65) Prior Publication Data

US 2020/0117650 A1    Apr. 16, 2020

Related U.S. Application Data

(63) Continuation of application No. 16/514,877, filed on Jul. 17, 2019.

(60) Provisional application No. 62/699,528, filed on Jul. 17, 2018.

(51) Int. Cl.
*G06F 16/22*   (2019.01)
*G06F 16/27*   (2019.01)
*G06F 16/28*   (2019.01)
*G06F 7/08*    (2006.01)

(52) U.S. Cl.
CPC ............ *G06F 16/2282* (2019.01); *G06F 7/08* (2013.01); *G06F 16/278* (2019.01); *G06F 16/285* (2019.01)

(58) Field of Classification Search
CPC ............... G06F 16/275; G06F 16/2372; G06F 16/2379; G06F 16/278; G06F 16/2282
See application file for complete search history.

(56) References Cited

U.S. PATENT DOCUMENTS 8,150,889 B1    4/2012  Bacthavachalu et al.
8,903,803 B1   12/2014  Aly et al.
9,075,773 B1 *  7/2015  Rakitzis .............. G06F 11/2094
                        (Continued)

FOREIGN PATENT DOCUMENTS

WO    WO-2020018718 A1    1/2020

OTHER PUBLICATIONS

"International Application Serial No. PCT/US2019/042284, International Search Report dated Oct. 17, 2019", 2 pgs.
(Continued)

*Primary Examiner* — Marc S Somers
(74) *Attorney, Agent, or Firm* — Schwegman Lundberg & Woessner, P.A.

(57) ABSTRACT

Automatic clustering of a database table is disclosed. A method for automatic clustering of a database table includes receiving an indication that a data modification task has been executed on a table and determining whether the table is sufficiently clustered. The method includes, in response to determining the table is not sufficiently clustered, selecting one or more micro-partitions of the table to be reclustered. The method includes assigning each of the one or more micro-partitions to an execution node to be reclustered.

27 Claims, 18 Drawing Sheets

(56) References Cited

U.S. PATENT DOCUMENTS

| | | |
|---|---|---|
| 9,411,862 B1 | 8/2016 | Wang et al. |
| 10,133,767 B1* | 11/2018 | Cole .................. G06F 16/2322 |
| 2003/0195898 A1 | 10/2003 | Agarwal et al. |
| 2003/0212520 A1 | 11/2003 | Campos et al. |
| 2004/0034643 A1* | 2/2004 | Bonner ............... G06F 16/2282 |
| 2008/0222104 A1 | 9/2008 | Stewart et al. |
| 2009/0193006 A1 | 7/2009 | Herrnstadt |
| 2009/0287668 A1 | 11/2009 | Evans et al. |
| 2010/0011013 A1 | 1/2010 | Singh |
| 2010/0223618 A1 | 9/2010 | Fu et al. |
| 2012/0221577 A1* | 8/2012 | Fuh .......................... G06F 16/22 707/741 |
| 2014/0095502 A1 | 4/2014 | Ziauddin et al. |
| 2014/0344507 A1 | 11/2014 | Piggin et al. |
| 2015/0135183 A1* | 5/2015 | Kipp .......................... G06F 9/46 718/103 |
| 2015/0363124 A1 | 12/2015 | Rath et al. |
| 2017/0177639 A1* | 6/2017 | Schmidt-Kluegmann ................... G06F 16/27 |
| 2018/0232661 A1 | 8/2018 | Li et al. |
| 2020/0026695 A1 | 1/2020 | Yan et al. |

OTHER PUBLICATIONS

"International Application Serial No. PCT/US2019/042284, Written Opinion dated Oct. 17, 2019", 7 pgs.

"U.S. Appl. No. 16/514,877, Response filed May 20, 2020 to Non Final Office Action dated Feb. 20, 2010", 12 pgs.

"U.S. Appl. No. 16/514,877, Non Final Office Action dated Feb. 20, 2020", 32 pgs.

"U.S. Appl. No. 16/514,877, Notice of Allowance dated Jun. 17, 2020", 8 pgs.

"U.S. Appl. No. 16/918,591, Non Final Office Action dated Aug. 18, 2020", 16 pgs.

* cited by examiner

INCREMENTAL CLUSTERING OF DATABASE TABLES

CROSS-REFERENCE TO RELATED APPLICATIONS

This application is a Continuation of U.S. patent application Ser. No. 16/514,877 filed Jul. 17, 2019 titled "INCREMENTAL CLUSTERING OF DATABASE TABLES", which claims priority to U.S. Provisional Patent Application Ser. No. 62/699,528 filed Jul. 17, 2018 titled "SYSTEMS, METHODS, AND DEVICES FOR AUTOMATIC CLUSTERING OF A DATABASE TABLE," both of which are incorporated herein by reference in their entireties.

TECHNICAL FIELD

The present disclosure relates to databases and more particularly relates to clustering maintenance of a database.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail company wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

However, further to the above example, the retail company may have a database table storing an enormous sum of information. It can be challenging to execute queries on a very large table because a significant amount of time and computing resources is required to scan the entire table. Therefore, it can be desirable to execute a query without scanning the entire table. In some implementations, the query may be executed by only scanning particular sections of the table that include pertinent information for responding to the query. This implementation is most effective if the particular sections of the table are organized well and can easily be identified.

In light of the foregoing, disclosed herein are improved systems, methods, and devices for automatic database partitioning and clustering. The systems, methods, and devices of the disclosure can be leveraged to improve database performance and particularly to improve table scanning and query execution performance in database systems.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1A:
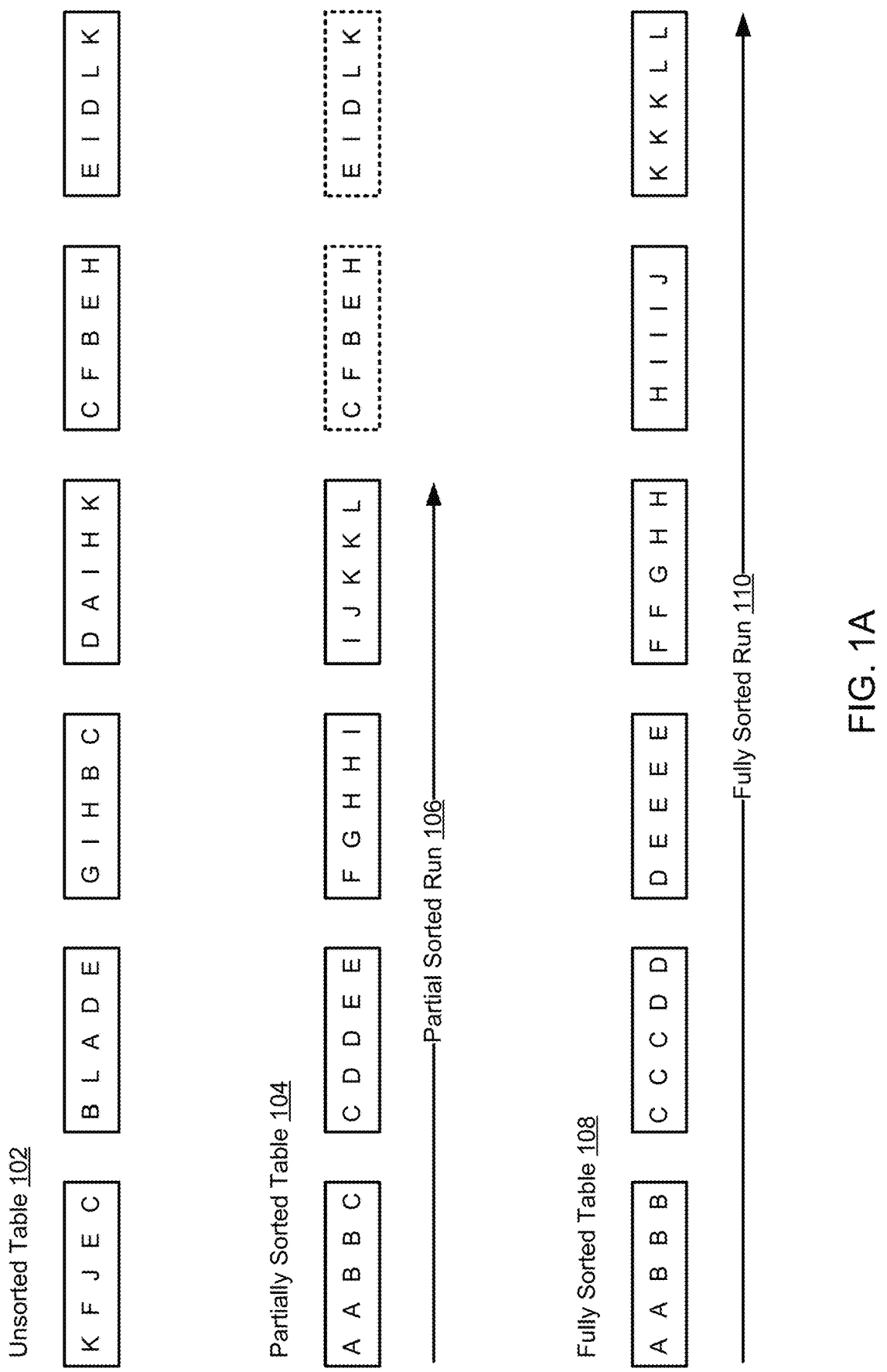
FIG. 1A is a block diagram of an example table of a database undergoing sorting and clustering operations, according to embodiments of the disclosure.

Disclosed herein are systems, methods, and devices for automatic partitioning and clustering of database data. The systems, methods, and devices disclosed herein improve database performance by organizing data into multiple partitions and clustering the data to improve query performance for the database.

A method of the disclosure includes receiving an indication that a data modification task has been executed on a table and determining whether the table is sufficiently clustered based on the data modification task. The method includes, in response to determining the table is not sufficiently clustered, selecting one or more micro-partitions of the table to be reclustered. The method includes assigning each of the one or more micro-partitions to an execution node to be reclustered.

Databases are widely used for data storage and data access in computing applications. Databases may include one or more tables that include or reference data that can be read, modified, or deleted using queries. However, for some modern data warehouse systems, executing a query can be exceptionally time and resource intensive because modern data warehouse systems often include tables storing petabytes of data. Querying very large databases and/or tables might require scanning large amounts of data. Reducing the amount of data scanned for database queries is one of the main challenges of data organization and processing. For such an enormous sum of data, it can be important to avoid scanning the entire table when running analytical queries on the data stored in the table. The systems, methods, and devices of the disclosure provide means for improving performance of table scans by way of automatic partitioning and clustering of table data.

There have been different approaches known in the art for improving performance of table scans. Some systems create primary and secondary indices on a table to facilitate efficient scans on those dimensions. The main issue with this implementation is that the secondary indices can be expensive to maintain, and the indices are only beneficial for the dimensions on which they are defined. Other systems create separate read and write stores where the read store is optimized for query performance. The downside of this implementation is that write stores have a limited capacity. It can be very expensive to merge write stores into read stores or delete data from a read store. In light of the foregoing, disclosed herein are improved systems, methods, and devices for improving table scanning in a database system.

An embodiment of the disclosure pertains to automated partitioning and clustering of database data into zone maps. Zone maps facilitate efficient pruning of database data by maintaining metadata for each partition of a table. The metadata may include, for example, a minimum/maximum value pair for each column in the partition, structural information for the table or the partition, an aggregated metric for the partition, and so forth. The zone maps can be particularly effective for improving query performance when there is data locality for pruning columns in a partition of the table.

Embodiments of the disclosure pertain to partitioning database data. Partitioning is a canonical data warehouse technique wherein a large table is divided horizontally into smaller units according to explicitly defined partitioning functions. Some common partitioning functions include range partitioning, list partitioning, hash partitioning, and so forth. In an embodiment, metadata for each partition of a table is stored in a metadata store, and the metadata can be used to identify which partition of the table needs to be scanned to respond to a query. Partitioning is useful for "pruning" database data during query execution to eliminate all partitions that do not pertain to the query parameters. Partitioning also helps query processing by limiting the memory footprint for responding to the query and reducing data shuffling in the execution engine. Additionally, partitions can be used as a unit of management for Data Manipulation Language (DML) commands.

Partition pruning is a means for identifying partitions that are known to not qualify for an operation, and then avoiding scanning those partitions. Partition pruning may alternatively be referred to as partition elimination or fragment elimination. An example of partition pruning may be implemented when responding to a query. In the example, a query is requested that seeks information for only two dates, and the table data may be split into partitions according to time. For example, each partition may include one week of data, one month of data, and so forth. Pruning may be used to eliminate all partitions that do not include data for the two dates requested in the query. Pruning can be done during compile time or execution time and may further be done when executing a join operation.

However, traditional pruning and partitioning methods have numerous shortcomings. One shortcoming is that static partitioning needs to be defined upfront such that the partitioning scheme is rigid. This type of partitioning is typically only useful for queries with predicates on partition keys. Therefore, the partitioning scheme may need to be manually updated by a user to ensure the partitioning is useful for different query predicates. With such partitioning schemes, it is very easy to have partitions that are either too big or too small. For example, popular partition keys could have very large partitions and rare partition keys may have very small partitions. This scheme requires the data to be uniformly distributed over partitions to avoid skews when executing a join operation to respond to a query. In light of the foregoing, disclosed herein are improved systems, methods, and devices for automatic micro-partitioning and reclustering.

Reclustering of a database table is a process that reorganizes the physical layout of data in the table to improve query performance. Reclustering can be made available as a Data Manipulation Language (DML) statement that a client account must invoke manually. A system may provide certain functions for computing metrics exposing how well clustered a table is and may further provide a current recommended practice for the client account to manually invoke such function to determine when and how much of a database table should be reclustered. A client account may follow this practice of manually reclustering one or more database tables and achieve satisfactory clustering overall, but this requires significant diligence and attention from the client account.

Manual reclustering of a database table can require considerable tuning and may be time consuming to implement. To keep up with ongoing DML operations, users may need to constantly run reclustering from time to time. The effectiveness of manual reclustering is often limited by resources such as the size of a virtual warehouse configured to perform the clustering operation. Additionally, manually reclustering operations may block client DML operations such as delete, update, and merge operations.

A known method of automatic clustering of a database table includes reclustering new database partitions being inserted for all DML statements. This can lead to partial automation of clustering maintenance for a client account. However, this method is very costly because the sorting operation required by this method can be very expensive depending on the size of the DML operation. A large DML operation can lead to sort spilling, which incurs expensive remote Input/Output(s). This can significantly slow down the execution time of DML statements and disrupt execution pipelines such as ETL (extract, transform, load) processes and data ingestion pipelines. Further, performing automatic clustering as part of a DML statement can impact additional DML operations and lead to a degradation in DML performance.

In some implementations, the most expensive operation in database reclustering is the sorting operation. The sorting operation may be improved through clustering operations. Because the goal of clustering is to improve query performance (e.g. that benefit from partition pruning), rather than achieve exact sorting, clustering can be performed as an approximate operation. Applicant recognizes that full sorting is not necessary in all implementations. Therefore, approximate sorting can be implemented because it requires far less computing power than full sorting. Exact sorting can potentially spill a large amount of database partitions and such spilling can be prohibitively expensive in terms of utilizing computing resources. A goal of approximate sorting is to avoid excessive spilling. Applicant recognizes that excessive spilling may be avoided by avoiding data redistribution. During compilation, target database partitions are sorted by ranges and partitioned by the ranges to generate a small set of partitions (may be referred to as a scanset) for each clustering worker. Each clustering worker then performs the sort locally such that there is no redistribution cost or spilling overhead.

The systems, methods, and devices disclosed herein provide means for automatic micro-partitioning and reclustering of database data. In an embodiment, data is automatically partitioned based on natural ingestion order. This does not require a partition definition upfront and the partitions may be based on size so there is no skew in the data. Additionally, natural ingestion order maintains correlations between columns and partitions can overlap in ranges. This scheme further enables horizontal and vertical pruning of data. Data may be pruned by partition and then by column and further by sub-column. Data may be partitioned into micro-partitions that are kept small to enable fine-grained pruning similar to an index. The systems disclosed herein may be designed to handle millions of partitions in a single table. Further, a metadata structure maintains data distribution for each column and sub-column for each micro-partition in the table. These micro-partitions constitute immutable storage devices and may be used as the unit of pruning for query and DML operations.

The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Before the methods, systems, and devices for reclustering a database is disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, a database table is a collection of records (rows). Each record contains a collection of values of table attributes (columns). Database tables are typically physically stored in multiple smaller (varying size or fixed size) storage units, e.g. partitions or blocks.

As used herein, a micro-partition is an immutable storage device in a database table that cannot be updated in-place and must be regenerated when the data stored therein is modified.

Applicant has developed systems, methods, and devices for automatic reclustering of a database table. Automatic reclustering may be provided as a service to a client account to enable a user associated with the client account to forego the time intensive process of fine-tuning manual clustering operations. Systems, methods, and devices for automatic clustering as disclosed herein enable all tables comprising clustering keys to be automatically maintained such that no client action is required, and a client account is not required to undergo the time intensive process of fine tuning the clustering operation. Automatic incremental reclustering as disclosed herein may be executed such that partition selection is decoupled from execution of the clustering operation.

In an embodiment, a method for automatic reclustering of a database table is provided. The method includes dividing partitions in database table into one or more levels, wherein the database table comprises a plurality of database partitions. The method includes selecting a subset of database partitions from at least one level of the one or more levels, wherein the subset of database partitions overlap according to clustering metrics at a worst clustered portion of the database table. The method includes selecting one or more micro-batches of database partitions from the subset of database partitions based on the clustering information of the micro-partition metadata. The method includes providing at least one of the one or more micro-batches of database partitions to a set of clustering workers to be reclustered.

The method may further include calculating a quantity of the one or more levels such that the quantity of the one or more levels is bounded, and wherein the quantity of the one or more levels is calculated based on a batch size selected for the clustering execution and a number of database partitions in the database table. The method may further include determining, based on the quantity of the one or more levels, an upper bound on a number of times a piece of data of the plurality of partitions is reclustered such that the piece of data of the plurality of database partitions is reclustered at most a number of times equal to the quantity of the one or more levels.

The method may further include determining one or more defined boundaries for the subset of database partitions, wherein selecting the subset of database partitions comprises selecting only those database partitions that fit within the one or more defined boundaries for the subset of database partitions. The method may be such that the one or more micro-batches of database partitions is independent such that the one or more micro-batches may be reclustered in parallel by a set of clustering workers in an arbitrary order.

In an embodiment, clustering levels are generated such that database partitions are divided into different levels. New partitions added to the database are placed in level zero. Partitions that have been reclustered the same number of times are placed into the same clustering level. The embodiment may include a constant level wherein a partition that is placed into the constant level is never altered. The reclustering operation may cease for a partition when the partition reaches the maximum clustering level. In an embodiment of the disclosure, reclustering is performed only on one level and partitions in the same level have a similar width. The operations may have a bounded cost such that each partition is reclustered at most a number of times equal to the maximum clustering level.

In an embodiment, the incremental clustering of the present disclosure is carried out in a serverless infrastructure such that clustering maintenance operations do not compete for resources with client queries. As such, the incremental clustering is performed in the background on behalf of a client account and does not require any client management. The incremental clustering operations may be performed on a shared internal computing cluster to increase efficiency of resource utilization. Also, the incremental clustering is carried out such that it does not block other DMLs issued by the user.

The automatic clustering operations of the present disclosure may continue until a database table is well clustered enough to satisfy a clustering threshold. A new DML command on the target table may trigger partition selection leading to a reclustering operation. As such, partition selection is decoupled from reclustering execution. The decoupling of partition selection and reclustering requires fewer resources and improves flexibility and scalability for scheduling clustering maintenance of the database.

Embodiments disclosed herein may be applied to data or tables in a database. By keeping data clustered, multiple database operations can be improved. Embodiments may include the ability to skip large chunks of data that are in different partitions, improved filtering and joins, as well as improve data manipulation language (DML) operations efficiency. As an example of improved filtering, when a query is received a large amount of data in different partitions may be filtered out based on query predicates. As an example of improved join operations, a probe table may be better pruned based on statistics of the build table. Aggregation pushdown can further be improved because child aggregations will yield more reduction and thus reduce the amount of data to be sent to parents. Also, DML operations such as delete can be performed more efficiently as large number of partitions that fully satisfy the search conditions can be deleted without reading each individual row.

Embodiments may also include the ability to introduce longer sequences of repeated values during query execution by keeping data clustered. For example, projections may be more efficient because a function may be computed once for thousands of identical values. Additionally, joins and aggregations may be improved by performing a lookup in a hash table once for thousands of identical values. Embodiments may also include the ability of identifying non-overlapping data subsets to enable determining smaller subsets of data that can be joined together or doing partial aggregations of data. Embodiments with sorted data may allow for partial ordered aggregations or merge joins.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring disclosure.

Referring now to the figures, FIG. 1A illustrates a block diagram of an example table sorted into multiple partitions. The same data is shown in the form of an unsorted table 102, a partially sorted table 104, and a fully sorted table 108. Each of the discrete blocks represents a micro-partition of the table. The letters organized in the micro-partitions blocks are the same for each of the unsorted table 102, the partially sorted table 104, and the fully sorted table 108. The letters may represent specific data in the table, a range of data in the table, data conforming with a query predicate, and so forth.

The unsorted table 102 may represent the organization of data according to when the data was ingested into the database. For example, the six micro-partitions for the unsorted table 102 may store data based on when the data was ingested into the database. The letters are scrambled across the six micro-partitions because the data was not sorted into the micro-partitions based on any defined partitioning parameters other than ingestion time.

The partially sorted table 104 represents data that is partially sorted with respect to the unsorted table 102. The example letters are same across the six micro-partitions for the unsorted table 102, the partially sorted table 104, and the fully sorted table 108. In the partially sorted table 104, the first four micro-partitions have been sorted by a partial sorted run 106. The partial sorted run 106 organized the data for the first four micro-partitions. As shown in the schematic diagram in FIG. 1A, the example letters are not sorted in alphabetical order. It should be appreciated that the letters being sorted in alphabetical order in the figure is illustrative only, and that database data may be sorted according to any suitable parameters. The two remaining micro-partitions having a dotted line outline are unsorted and are the same as the corresponding micro-partitions in the unsorted table 102.

Each of the six micro-partitions in the fully sorted table 108 has been sorted by a fully sorted run 110. The fully sorted run 110 sorted each of the example letters across the six micro-partitions. Again, it should be appreciated that the letters being sorted in alphabetical order is representative only and that database data may be sorted and partitioned according to any suitable parameters.

Figure 1B:
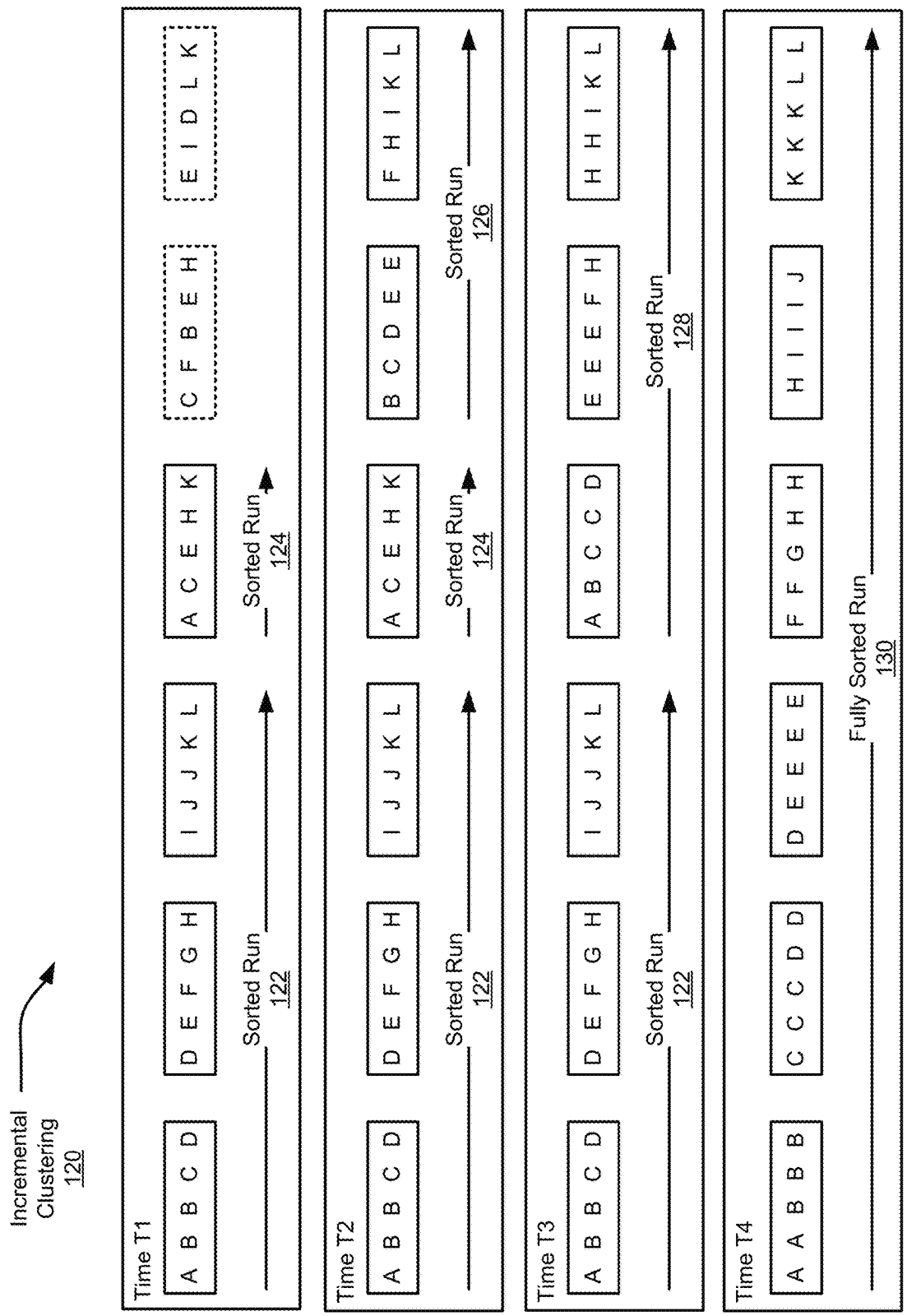
FIG. 1B is a block diagram of an example table of a database undergoing incremental clustering operations, according to embodiments of the disclosure.

FIG. 1B illustrates a block diagram of an example of incremental clustering 120 as discussed herein. The six micro-partitions shown in times T1, T2, T3, and T3 include the same exemplary data as that shown in the unsorted table 102, the partially sorted table 104, and the fully sorted table 108 in FIG. 1A. FIG. 1B illustrates wherein the six micro-partitions are incrementally clustered over a series of clustering operations occurring at times T1, T2, T3, and T2.

At time T1, the data is partially clustered. The first three micro-partitions are clustered and sorted in a sorted run 122. The fourth micro-partition is clustered and sorted in a sorted run 124. The remaining two micro-partitions have not been clustered or sorted.

At time T2 the data is partially clustered with a new clustering operation. The first three micro-partitions remain sorted based on sorted run 122 that occurred at time T1. The fourth micro-partition remains sorted based on sorted run 124 that occurred at time T1. At time T2, the fifth and six micro-partitions are sorted based on sorted run 126.

At time T3, the data is partially clustered with a new clustering operation. The first three micro-partitions remain sorted based on sorted run 122 that occurred at time T1. The fourth, fifth, and sixth micro-partitions are now sorted by sorted run 128 that occurs at time T3. Finally, at time T4, all six micro-partitions are sorted by sorted run 130. As shown in FIG. 1B, the micro-partitions are not immediately fully sorted as shown by the fully sorted table 108 in FIG. 1A. Instead, the micro-partitions are incrementally clustered beginning with the unsorted table 102 to the fully sorted table at time T4.

In an embodiment, the micro-partitions are selected according to a partition selection algorithm. The partition selection algorithm identified which partitions should be reclustered to provide this greatest improvement to query execution.

Figure 2:
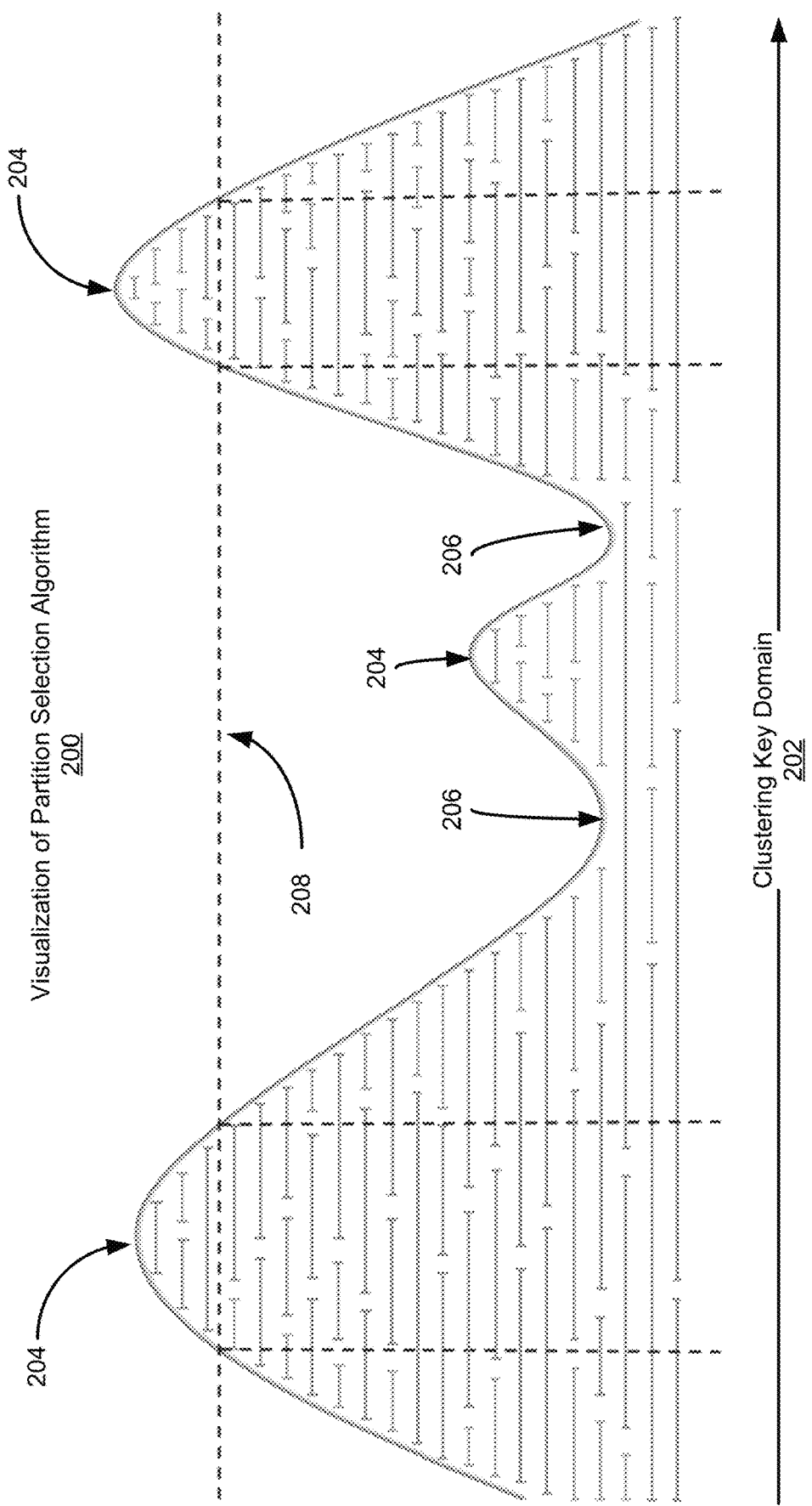
FIG. 2 is an example visualization of a partition selection algorithm, according to embodiments of the disclosure.

FIG. 2 is a visualization 200 of the partition selection algorithm. The x-axis is the clustering key domain 202. The visualization 200 includes multiple horizontal lines, and each horizontal line represents one sorted run. As shown in the visualization 200, the sorted runs vary in length to represent the sorting of wider partitions and relatively narrow partitions. The visualization 200 shows that the table has peaks 204 and valleys 206. The peaks 204 indicate portions of the table where the table is poorly clustered and there are many overlapping partitions. The valleys 206 represent portions of the table that are well clustered and there are fewer overlapping partitions. The partition selection algorithm may promote the system to focus reclustering operations on the peaks 204 where the table is poorly clustered.

The partition selection algorithm is designed to be cost efficient to run even when a table has many millions of rows. The partition selection algorithm can run quickly and requires little memory usage. The partition selection algorithm is designed to reduce peaks in the table based on heuristics. One example is to define a constant micro-partition having minimum and maximum values for the cluster key columns. The constant micro-partition is optimal for pruning purposes and does not need to be combined or resorted with other micro-partitions. The partition selection algorithm considers the amount of compute resources available, such as the size of the available virtual warehouses, to avoid excessive spilling. The partition selection algorithm may use data structures such as stabbing count arrays and interval trees to compute the clustering metrics and perform the partition selection to have a relatively efficient algorithm.

In an embodiment, a reduction goal 208 may be defined indicating how much of the peak 204 needs to be reduced. The reduction goal 208 may be determined based on budget. In the example visualization 200 illustrated in FIG. 2, the reduction goal 208 may be calculated based on a determination that there is not enough available resource to work on the middle peak 204 because the middle peak 204 is not high enough. After the reduction goal 208 is calculated, partitions that overlap the reduction goal 208 are identified. In the example visualization 200 shown in FIG. 2, the first and third peaks 204 are above the reduction goal 208. The partition selection algorithm may be configured to select the widest partitions in the peak 204 to be reclustered. The wider the partition, the more significant the reduction in the height of the peak 204 after reclustering.

Figure 3:
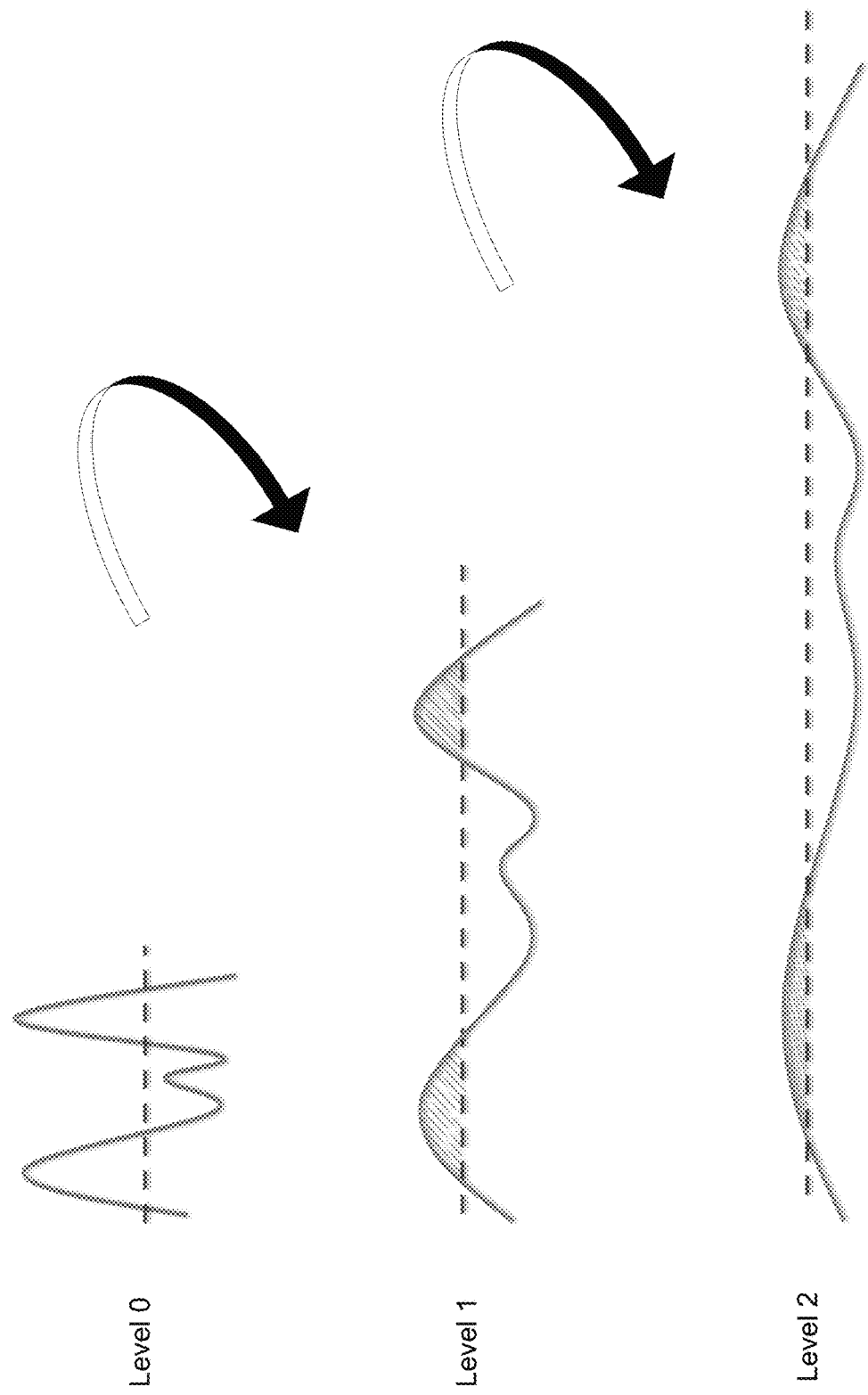
FIG. 3 is an example visualization of a partition selection algorithm as a table undergoes reclustering operations, according to embodiments of the disclosure.

FIG. 3 illustrates a visualization of how the peaks 204 are reduced over time after reclustering operations are performed on the table. As shown in FIG. 3, the table has very high peaks at level 0. The peaks are lowered at level 1 after a series of reclustering operations are performed on the table. Again, the peaks are lowered at level 2 after more reclustering operations are performed on the table.

Figure 4:
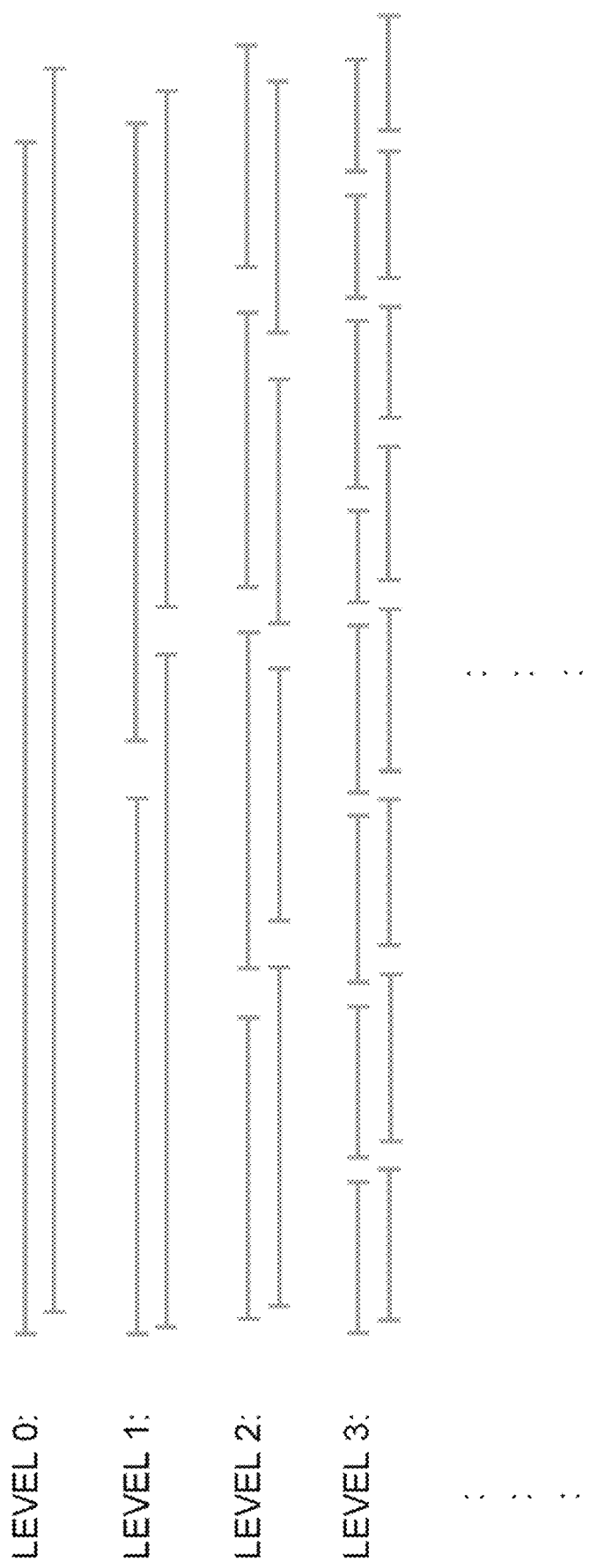
FIG. 4 is an example visualization of partitions of a table as the table undergoes reclustering operations, according to embodiments of the disclosure.

FIG. 4 illustrates a visualization of the size of the partitions over time after reclustering operations are performed on the table. As shown in FIG. 4, the table has a small number of very large partitions at level 0. The number of partitions increases, and the size of the partitions decreases from level 0 thru level n as reclustering operations are performed on the table.

In an embodiment, the reclustering operations performed on the table include "multi-dimensional clustering." Multi-dimensional clustering is performed based on a multi-dimensional clustering key. The multi-dimensional clustering key is based on metadata that identifies real minimum and maximum values pairs instead of using the minimum and maximum values for each column of the table. Multi-dimensional clustering is similar to a function index and is evaluated by an execution engine. The multi-dimensional clustering keys can be specified based on expressions that can be evaluated by the execution engine. Multi-dimensional clustering essentially maps multi-dimensional clustering keys to a one-dimensional domain. Multi-dimensional clustering may include performing order preserving encoding so that order is preserved after concatenating each encoded column.

In an embodiment, the mapping from multi-dimensional space to a one-dimensional domain may be interpreted as a space filing curve, in an embodiment, a linearization mechanism is deployed such as linear order. The linearization mechanism serves as a concatenation of different dimensions. In an embodiment, Z-ordering, Grey-order, Moore-curves, and/or Hilbert-curves may be deployed to map the multi-dimensional space to a one-dimensional domain. Z-order and Grey-order are similar for pruning purposes. Hilbert curves can be expensive to compute without providing significant benefit. Hilbert curves may be more useful for geo-related functionalities. Z-order, Grey-order, and Hilbert curve may be referred to as interleaved ordering because these operations are configured to interleave bits from different dimensions rather than concatenate the different dimensions.

Figure 5:
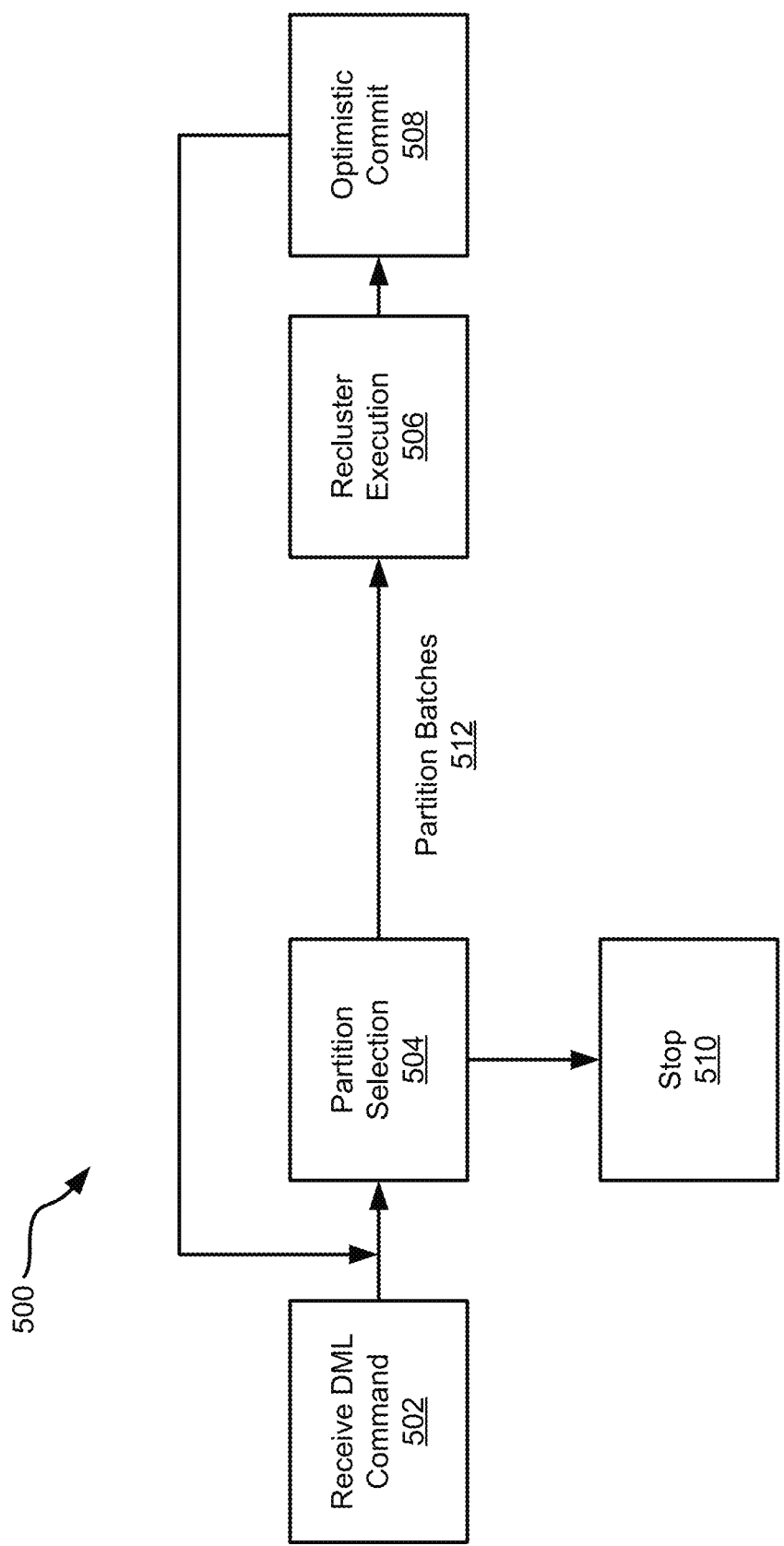
FIG. 5 is a process flow for automatic incremental reclustering of a table, according to embodiments of the disclosure.

FIG. 5 illustrates a process flow 500 for automatic reclustering on a table. The process flow 500 includes receive a DML command at 502. The DIM, command may alter the table by adding, removing, or modifying rows in the table. Because the table is partitioned into immutable micro-partitions, the DML command causes one or more micro-partitions of the table to be fully regenerated rather than modified in-place.

The process flow 500 includes selecting partitions to be reclustered at 504. The partition selection 504 may be performed according to the partition selection algorithm as discussed herein. The partition batches 512 are identified and reclustering is executed at 506. After the reclustering operations have been executed at 506, the table is committed at 508. The reclustering operations continue until the partition selection algorithm determines that reclustering can stop at 510.

Figure 6:
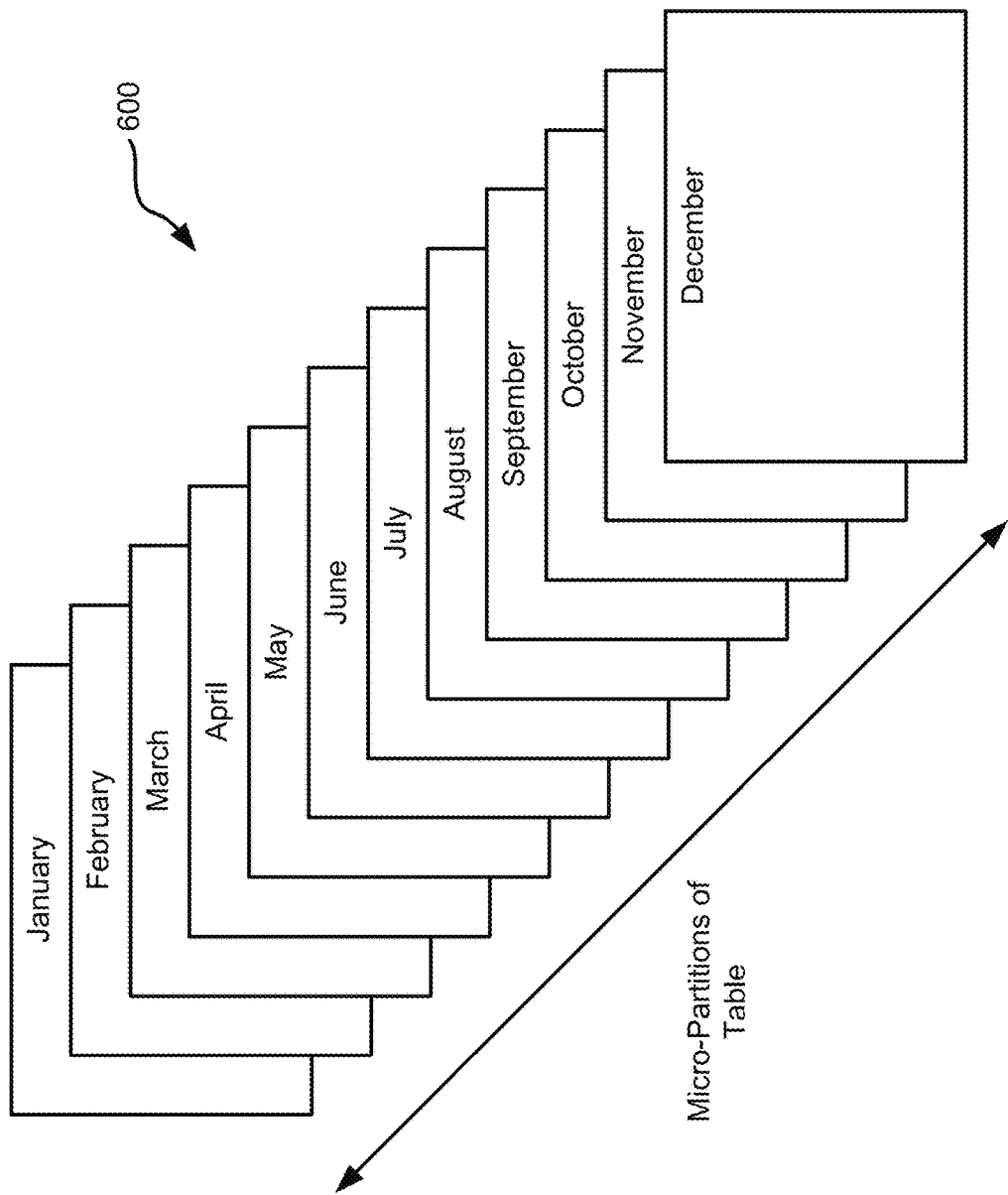
FIG. 6 is an example table parsed into multi-partitions based on time of ingestion, according to embodiments of the disclosure.

FIG. 6 illustrates an example embodiment of a table 600 split into multiple partitions. In an embodiment, the table is split into partitions when the data is ingested into the database. In an example, the table data may be split into partitions according to time. This is especially simple because the partitions are generated as the data is ingested, and new partitions can be created at certain time stamps. In the example shown in FIG. 6, the table 600 includes partitions for each month of the year. Data may be added to the January partition until the beginning of February for that year, and then data will be added to the February partition for that year. It should be appreciated that data may be organized into partitions in any suitable manner and that the organization structure shown in FIG. 6 is shown for exemplary purposes only.

Figure 7:
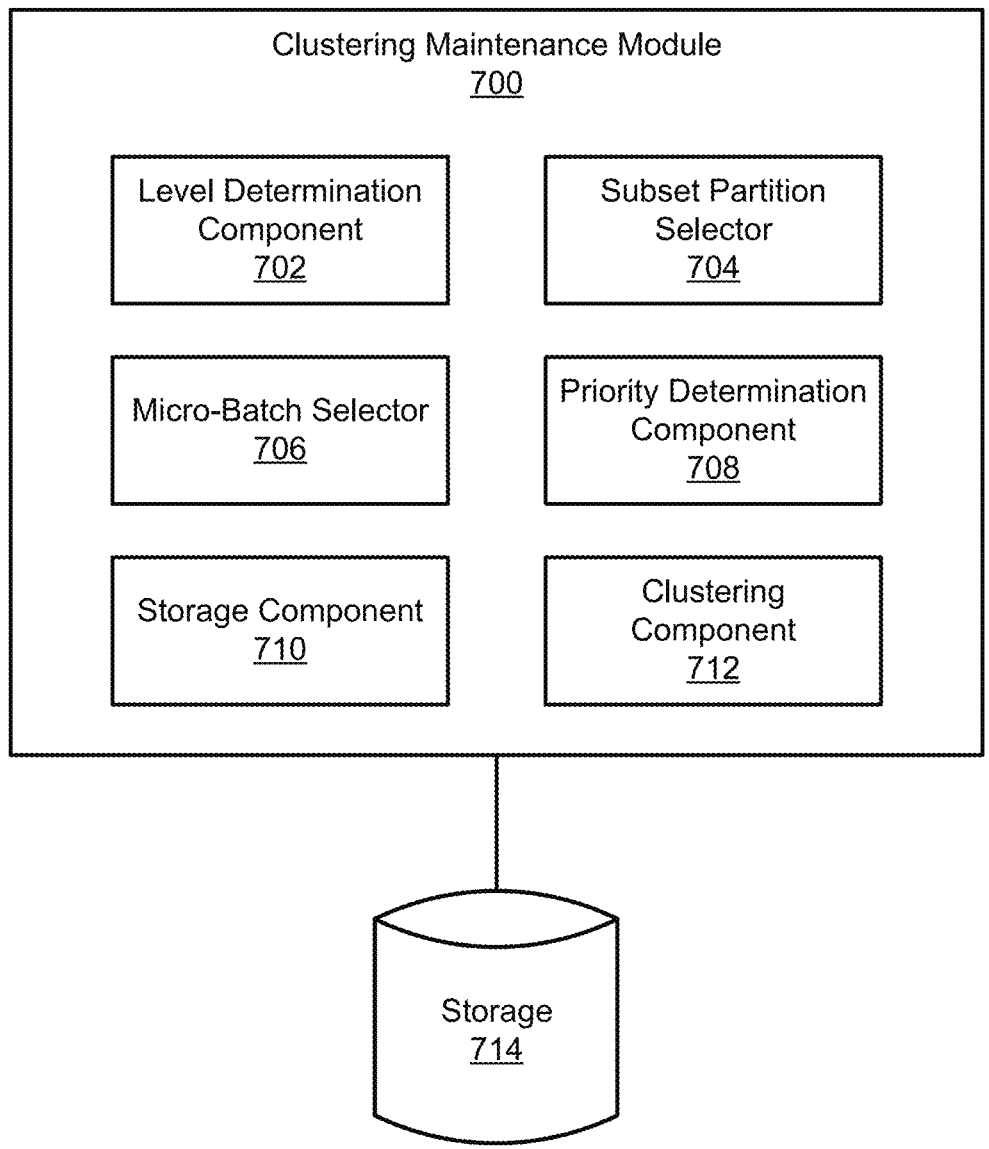
FIG. 7 is a block diagram of a database reclustering system, according to embodiments of the disclosure.

FIG. 7 illustrates a schematic block diagram of a clustering maintenance module 700. The clustering maintenance module 700 includes a level determination component 702, a subset partition selector 704, a micro-batch selector 706, a priority determination component 708, a storage component 710, and a clustering component 712. The clustering maintenance module 700 is in communication with storage 714 such as database storage.

The clustering maintenance module 700 can be configured to implement automatic reclustering of a database table based on available computing resources. For example, the clustering maintenance module 700 may recluster a specific micro-batch of database partitions when resources are available, and it may further assign a priority to a plurality of database tables and/or to a plurality of micro-batches within a database table. In an embodiment, the clustering maintenance module 700 includes a scheduling component that is decoupled from the clustering component 712. The scheduling component is configured to determine one or more micro-batches of database partitions that should be reclustered and the scheduling component may further assign a priority to each of the one or more micro-batches. In an embodiment, the scheduling component may encompass the level determination component 702, the subset partition selector, the micro-batch selector 706, and the priority determination component 708. The scheduling component may provide a micro-batch to the clustering component 712 when the computing resources are available to perform the reclustering.

The level determination component 702 divides the plurality of database partitions of the database table into one or more levels. The clustering component 712 will only recluster database partitions that are within the same level as determined by the level determination component 702. After each reclustering run by the clustering component 712, the resulting data is moved to the next level. The initial level, where new data is placed, is level zero and is considered the lowest level. The one or more levels as determined by the level determination component 702 begin with the lowest level i.e. level zero and increase from there.

The database table has a bounded number of levels. The level determination component 702 determines the total number of levels based on the size of the database table and the batch size of the clustering execution. The total number of levels provides an upper bound on the number of times the same piece of data of the database table may be worked on, because the same piece of data may be worked on at most as many times as there are levels in the database table.

The subset partition selector 704 selects a subset of database partitions within each level of the one or more levels. The subset partition selector 704 selects candidate partitions for follow up reclustering execution. Each partition operation centers on a worst clustered portion of the worst clustered level in the database table and selects the subset of partitions that is most efficient in improving the clustering of that level. The subset partition selector 704 selects only those database partitions that fit within the clearly defined boundaries of partition selection. As such, the subset partition selector 704 does not generate ultra-wide database partitions with respect to the clustering keys and guarantees maximum overlap of the selected partitions. There is no hard budget on how many database partitions the subset partition selector 704 may select for a certain candidate partition. A single candidate partition may potentially comprise orders of magnitude more partitions than the batch size used for execution. A goal of the subset partition selector 704 is to select all qualifying database partitions as opposed to, for example, leaving out an ultra-wide partition due to budget limits.

The micro-batch selector 706 extracts micro-batches of database partitions from a candidate partition. Before extracting the micro-batch of database partitions, the micro-batch selector 706 sorts each of the plurality of database partitions by the metadata on clustering keys. Micro-batches are then created based on the sort order of their clustering key metadata. This approach may perform presorting using metadata and avoid expensive global sorting involving heavy data transfer and synchronization. The micro-batch selector 706 may further configured to feed the micro-batches to a clustering component 712 to be reclustered. Each of the micro-batches is independent from other micro-batches such that each micro-batch can be worked on by the clustering component 712 in any arbitrary order.

The micro-batch selector 706 comprises a portion of the partition selection phase. The micro-batch selector 706 selects a batch of database partitions for execution of a reclustering operation by the clustering component 712. The execution of the reclustering operation may be executed as a special DML statement that performs local sorting of selected micro-batches. The execution phase will load the micro-batch of selected database partitions from the clustering state of the table. The execution phase includes checking for the validity of each batch before beginning execution of the reclustering operation. The clustering maintenance module 700 may again check for the validity of each micro-batch after execution and before committing reclustering. If the source micro-partitions are no longer valid after the clustering execution, the recluster DML operation is automatically rolled back without blocking user-issued DML statements on the table. The partition selection phase and the execution phase are decoupled so that each phase can be independently scheduled and scaled. Thus, for example, the micro-batch selector 706 is decoupled from the clustering component 712.

The priority determination component 708 examines a clustering state of the database table as represented by clustering level information. The priority determination component 708 determines whether the database table needs further reclustering, and if so, how much reclustering work is needed. It determines whether a table is good enough so that there is no further need to reclustering. This component also looks at past DML, operations on the table to determine whether it is time to start reclustering the table again.

The storage component 710 stores information pertaining to the clustering operations of the clustering maintenance module 700. The storage component 710 may store predicate repository information, including predicate frequency, predicate pruning effectiveness, and/or predicate filtering effectiveness. The storage component 710 may store clustered table information (see 500 at FIG. 5), including current clustering state (see 502) information, level information (see 504), and/or information pertaining to batches selected for clustering (see 506).

The clustering component 712 is configured to recluster a micro-batch of database partitions. The clustering execution is performed concurrently by multiple workers as opposed to a single worker. The clustering execution is decoupled from partition selection to reduce resource costs and increase flexibility and scalability of scheduling the incremental clustering operations. The clustering component 712 operates on a multi-tenant virtual warehouse dedicated to performing automatic clustering on behalf of a client account, wherein the clustering component 712 operates in a background to the client account and does not impact DML operations of the client account.

The storage 714 may include database storage and may be configured to store each of a plurality of database tables including a plurality of database partitions. The storage 714 may include cache memory storage and/or longer term or slower retrieval storage.

A database table can be added for consideration for automatic clustering when it is initially created as a clustered table; when clustering keys are added to an existing table; or when the user resumes reclustering on the table. When a new database table is added, the database table is added to a queue of database tables to work on. A partition selection task will run and select a batchset from the new database table. The new database table may be returned to the queue where the existing batchset has been worked on by clustering execution i.e. after the batchset becomes zero, the new database table is returned to the queue to select partitions for reclustering. The new database table may further be returned to the queue where a DML operation has occurred on the table. Partition selection interleaves regular selection process with small partition defragmentation.

The clustering maintenance module 700 may include a separate scheduler for execution jobs. The scheduler selects a next database table to be reclustered based on the priority of the table, as well as some fairness guarantees. For example, to achieve fairness among a plurality of accounts or servers, the scheduler may use weighted fair queuing. The warehouse (see e.g. database service manager 902) may scale up or scale down depending on the workload of reclustering tasks to run.

In an embodiment, the clustering maintenance module 700 is configured to perform recluster operations from the clustering component 712 without disrupting foreground client DML operations. Reclustering executions are optimistic and non-blocking such that the reclustering execution will never disrupt foreground DML operations for a client account. Shorter transactions are avoided to avoid excessive overhead on the transaction management layer. Longer transactions are avoided because there exists an increased chance of conflict with DML operations by the client account and the reclustering work may need to be rolled back. The clustering maintenance module 700 may include a component for handling transaction management.

In an embodiment, the clustering maintenance module 700 (or the clustering component 712) conducts a validity check before and after execution of the reclustering operation. The validity check may include checking whether there have been deletions between the database table version of the partition selection and the database table version at the time of the commit. The validity check may include checking whether any source partition in a particular micro-batch has been deleted, in which case that micro-batch becomes invalid. If the clustering component 712 determines that a micro-batch is invalid, the micro-batch is discarded either during compilation before execution of the reclustering operation or after execution before commit of the reclustering operation.

In an embodiment, the work performed by the clustering maintenance module 700 is performed in the background and may occur in a continuous fashion. In an embodiment, as soon as a database table is marked as a clustered table through a specified clustering key, the database table is added for consideration by the clustering maintenance module 700. The client account may control the cost of automatic clustering by suspending and resuming automatic clustering on a clustered database table. The client account may further receive information indicating how well a database table is clustered. The information may further include a historical trend of how well clustered the database table is such that a user may take actions according to the information, such as manual reclustering of a certain database table.

Figure 8:
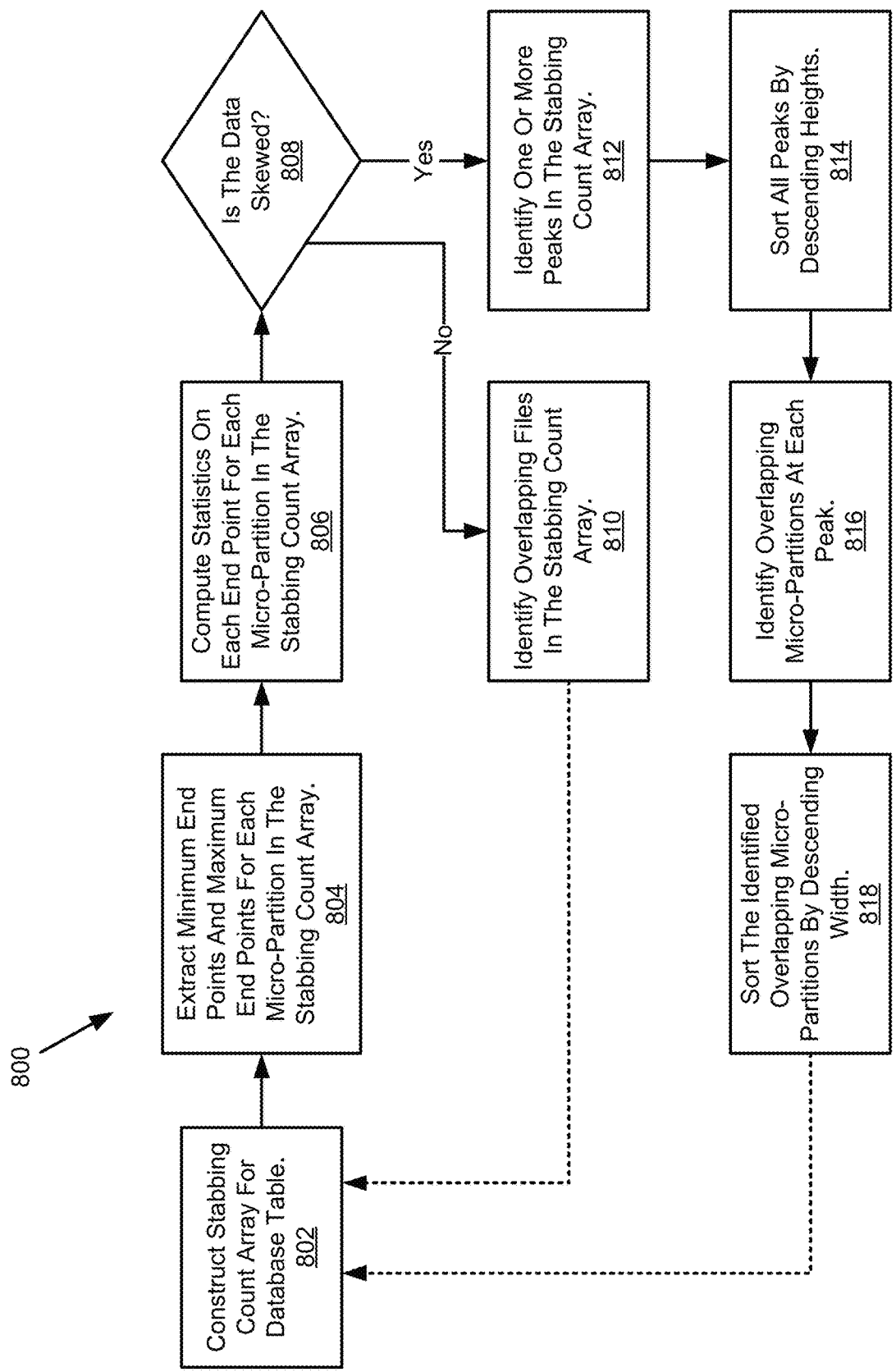
FIG. 8 is a schematic block diagram illustrating a process flow for partition selection, according to embodiments of the disclosure.

FIG. 8 illustrates a schematic block diagram of a process flow 800 for partition selection. Partition selection may be implemented where a maximum budget is assumed. The maximum budget may be specified by a client account or determined during compilation based on available compute resources such as amount of memory available. In an embodiment, the algorithm for reclustering of a database table is stateless and global such that it does not maintain intermediate states between runs, and the partition selection process flow 800 always takes all partitions of a database table into consideration.

In an embodiment, the process flow 800 for partition selection includes constructing a Stabbing Count Array based on metadata information of clustering keys for the entire database table at 802. The process flow 800 includes extracting from the Stabbing Count Array a minimum endpoint and/or a maximum endpoint for database partition of a plurality of database partitions within the database table at 804. The process flow 800 includes computing, based on the Stabbing Count Array, one or more statistics for each of the minimum endpoint and the maximum endpoint for each database partition at 806. The process flow 800 includes determining whether the data is skewed at 808. If the data is not skewed, the process flow 800 includes identifying any overlapping database partitions at 810. If the data is skewed, the process flow 800 includes identifying one or more peaks in the Stabbing Count Array at 812. The process flow includes sorting each of the one or more peaks from the Stabbing Account Array by descending heights, up to a certain threshold at 814. The process flow includes, for each of the one or more identified peaks, identifying overlapping partitions for that peak at 816. The process flow 800 includes sorting the identified overlapping partitions, for each of the one or more peaks, by descending width at 818. In an embodiment, a greater number of overlapping partitions are found for deeper peaks compared with shallow peaks. The process flow 800 is iterated repeatedly (see dotted arrows extending from step 810 to 802 and from 818 to 802) until the global budget is filled.

Partition selection as illustrated in FIG. 8 promotes the selection of the widest database partitions that are overlapping with other database partitions. Such an embodiment may be prone to generating very wide database partitions. The algorithm behind the process flow 800 has a global concern and spreads the work across multiple peaks to work on, and this may lead to generating database partitions that connect the one or more peaks, and such database partitions may be very wide. Very wide database partitions may have a disproportionate impact on query performance because queries scanning small number of partitions are more sensitive to an increase in the number of partitions to scan. The process flow 800 may be implemented by specifying a predicate on the database table in a recluster statement, which applies the clustering algorithm on database partitions that remain after applying the predicate.

In an embodiment, a peak of the one or more peaks in the Stabbing Count Array does not include enough database partitions. Compared with the highest peaks, some lower peaks may include a smaller set of overlapping database partitions. As such, lower peaks may be less efficient because other overlapping partitions that should be worked on together may be excluded for budget reasons.

Figure 9:
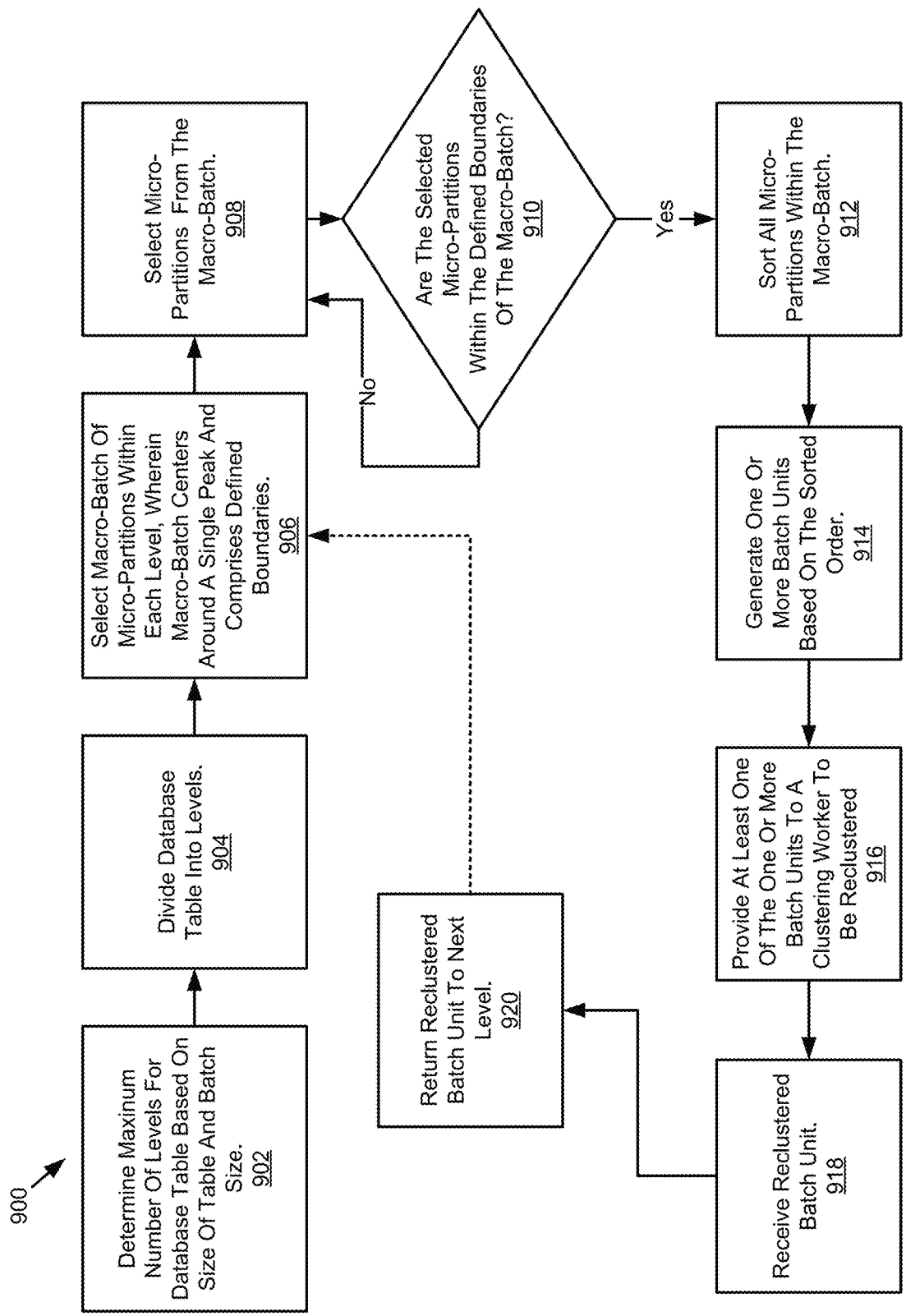
FIG. 9 is a schematic block diagram illustrating a process flow for reclustering of a database table, according to embodiments of the disclosure.

FIG. 9 illustrates a process flow 900 for selecting partitions for automatically reclustering a database table. The partitioning as illustrated in FIG. 2 may not lead to convergence when implemented with a small budget on a large database table and may lead to poor global clustering metrics for such a table. Applicant also recognizes that stateless reclustering algorithms could result in repeated work on the same piece of data, thus reducing the efficiency of the algorithm. Applicant herein presents the process flow 900 directed to focusing on local peaks during partition selection as well as maintaining additional states between reclustering operations. The process flow 900 generates a set of very small batches of database partitions, where each batch of database partitions is a unit of work to be completed by a single worker.

The process flow 900 includes determining a maximum number of levels for a database table based on a size of the database table and a batch size of the recluster execution at 902. The process flow includes dividing the database table into levels at 904, where the quantity of levels is bounded by the maximum number of levels as determined at 902. Only database partitions that are in the same level will be reclustered in the same batch, and after each recluster run, the resulting data will be moved into the next level. The process flow 900 includes selecting a subset of database partitions within each of the levels at 906. The subset of database partitions is such that the database partitions center around a single peak and comprise defined boundaries. The process flow 900 includes selecting database partitions from the candidate level at 908 and determining whether the selected partitions are within the defined boundaries of the candidate partition at 910. If the selected partitions are within the defined boundaries of the candidate partition, the process flow 900 proceeds and includes sorting all partitions within the candidate partition based on metadata information at 912. The process flow 900 includes generating one or more micro-batches based on the sorted order of the partitions within the candidate partition at 914. The process flow 900 includes providing at least one of the one or more micro-batches to a clustering worker for the micro-batch to be reclustered at 916. The process flow 900 includes receiving the reclustered micro-batch from the clustering worker at 918. The process flow 900 includes returning the reclustered micro-batch to the next level of the one or more levels at 920. The process flow 900 may be repeated as many times as necessary to maintain a clustered table.

The maximum number of levels for the database table (as determined at 902) is based on the size of the database table and the batch size. In an embodiment, the maximum number of levels is determined according to the equation below where the variable "b" refers to the batch size and the variable "n" refers to the number of partitions in the database table. The number of levels in the database table further provides an upper bound on the number of times a single piece of data from the database table may be worked on, because the single piece of data may be worked on at most as many times as there are levels in the table.

$$\text{Levels} = \log_b$$

The selection of the candidate range of partitions is performed within each level (see 906). The candidate range of partitions centers around a single peak and comprises clearly defined boundaries. The process flow 900 only selects database partitions that fit within the clearly defined boundaries of the candidate range. This can prevent the selection or generation of very wide partitions and may be considered a benefit over the process flow 800 illustrated in FIG. 8 in certain embodiments. The process flow 900 selects database partitions that fit within the clearly defined boundaries of the candidate range such that partitions within the same peak may be selected efficiently. In an embodiment, there is no budget on the number of database partitions that may exist within a single candidate range. A goal of the process flow 900 is to select all qualifying partitions as opposed to, for example, leaving out a very wide partition due to budget limits.

After the subset of database partitions has been selected (see 908), all partitions within the candidate partition are sorted efficiently based on metadata information at 912. The micro-batch (see 914) are generated based on the sorted order of the partitions within the candidate range. The micro-batches may be fed into a clustering worker that is configured to recluster each micro-batch. The micro-batches are entirely independent from one another and may be worked on in parallel in any arbitrary order.

Maintaining the database partitions in levels reduces the wasted resources used to work on the same piece of data. Further, maintaining database partitions in levels may provide a convenient way to determine when to stop reclustering a database table or when to lower the priority for reclustering the database table. In an embodiment, database reclustering is performed only when sufficient computing resources are available. In such an embodiment, reclustering may be scheduled for a database table based on how many partitions are located within each level of the database table. For example, if the database table comprises many partitions at a low level, for example level zero, then reclustering will likely improve the database table significantly. By contrast, if most of the database partitions are within a last level (i.e. a higher level or upper level), then the database table has already been reclustered numerous times and further reclustering of the database table may provide negligible benefit.

In an embodiment, a benefit of the process flow 900 arises from focusing on local peaks (within the levels or candidate partitions) rather than global peaks (within the entire database table). In an embodiment where the process focuses on global peaks (see e.g. process flow 800 in FIG. 8), the column-wise zone map properties for the entire database table must be loaded during reclustering. This can be expensive in an embodiment directed to a very large database table. In an embodiment where multi-level column-wise zone map properties are implemented, it may be efficient to implement loading the column-wise zone map properties for only part of the database table. In an embodiment, this may reduce memory and computational overhead for a reclustering algorithm. Additionally, focusing on local peaks rather than global peaks may provide for adapting feedback from usage data of the database table. In an embodiment, usage data may be gathered on how a predicate is used, and the usage data may be utilized to determine which part of a database table is "hot" or highly utilized and would benefit more from reclustering.

In an embodiment, the process flow 900 benefits from the maintenance or storage of information related to the database table. In such an embodiment, the stored information may include level information for each database partition within the database table. This may include an indication of a level identification number that identifies which level the database partition is associated with. This may include a record of database partitions that are associated with each of the one or more levels. The stored information may include a record of micro-batches that have been selected for reclustering (see e.g, 916). In an embodiment, a micro-batch is selected for reclustering, but the micro-batch is not provided to a clustering worker until there are sufficient computing resources available to perform the reclustering operation as determined by a separate scheduler.

Figure 10:
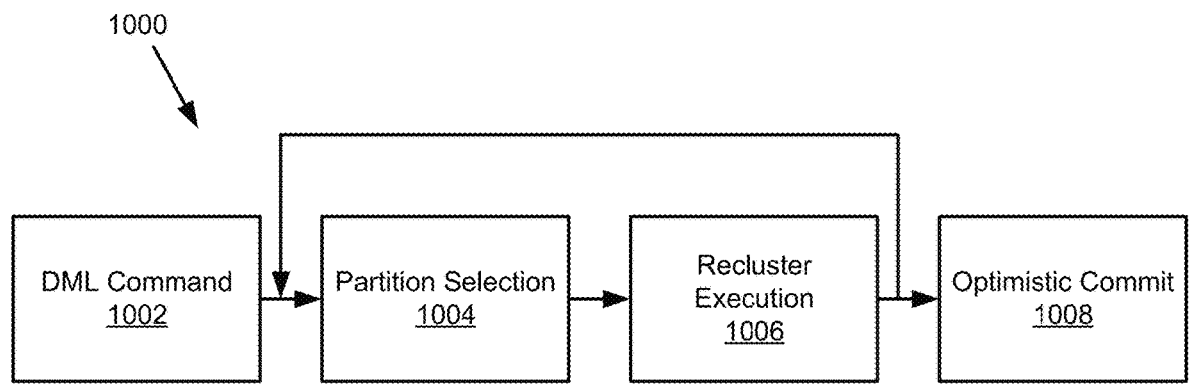
FIG. 10 is a schematic block diagram illustrating a process flow for partitioning and reclustering of a database table, according to embodiments of the disclosure.

FIG. 10 illustrates a process flow 1000 for automatic clustering of a database table. The process flow 1000 begins with receiving at 1002 a DML operation from a client account. The partition selection 1004 process is initiated, and the selected partitions undergo the recluster execution at 1006. The process flow 1000 undergoes an optimistic commit 1008 such that there is no impact on user-specified DML operations. The database table is continuously reclustered until it is determined that the database table is clustered well enough. The DML operation 1002 triggers partition selection 1004. The partition selection 1004 is decoupled from the recluster execution 1006 such that the clustering execution is less expensive in terms of resources, and further such that the recluster execution 1006 has increased flexibility and scalability for scheduling.

Figure 11:
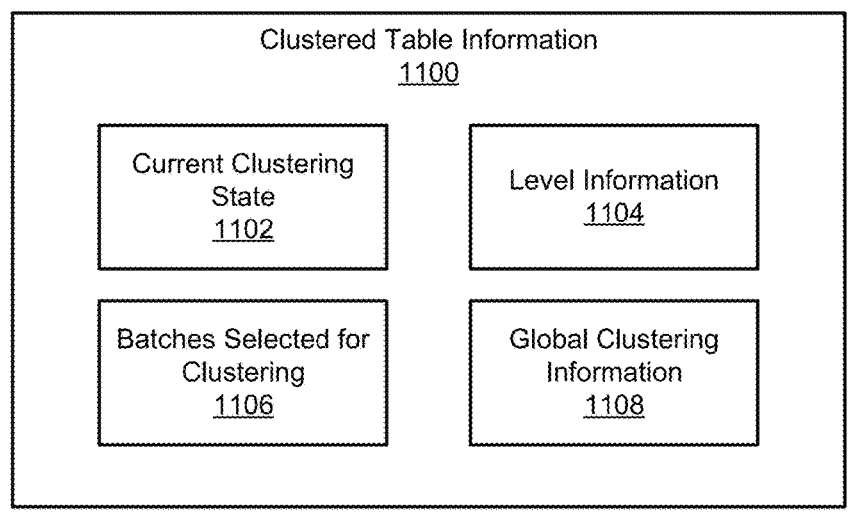
FIG. 11 is a schematic block diagram illustrating clustered table information, according to embodiments of the disclosure.

FIG. 11 illustrates a schematic block diagram of clustered table information 1100. In an embodiment, a system knows that a table is clustered by checking a "clusterBy" field. For clustering service in one embodiment, a system cannot rely on scanning all tables in the database to determine which ones are clustered. In an embodiment, the system includes a separate metadata store for clustered tables. After a database table is added to the clustering service, a clustering state that is stored in a runtime metadata store may be created for the database table. The clustering state i.e. the clustered table information 1100 includes current clustering state 1102 information, level information 1104, information concerning batches selected for clustering 1106, global clustering information 1108, and any other suitable information.

The current clustering state 1102 information may indicate a partition selection table version or partition selection level that is selected for reclustering. The level information 1104 indicates one or more levels associated with the database table and indicates which level(s) of the one or more levels that are selected for reclustering. The information concerning batches selected for reclustering 1106 indicate the one or more micro-batches selected from the candidate range of the level that are selected for reclustering (see e.g. 914, 916). The batches selected for reclustering 1106 may indicate each of the current micro-batches that have been selected for clustering and each micro-batch may include an array of partitions.

Auxiliary data may further be stored for the clustering tables such as historical clustering data. The historical clustering data may indicate how well the database table was clustered at previous timestamps. Such stores of data may become prohibitively large and may be offloaded to other databases or systems. In an embodiment, such data may be displayed to a client device for displaying clustering information to a user of the system.

The table level information 1104 includes information such as how many partitions are in each level of a database table and an indication of the clustering state within each level of the database table. The level information 1104 may be periodically updated, for example when a new batchset is computed, or it may be updated constantly. For example, for an insert command or update command, new partitions for the database table may be added to the first level of the database table. For example, for a delete command, an update command, and/or a merge command, the database partitions may be deleted from a deeper or higher level of the database table. This can incur a cost and the load information from all database partitions within the database table may need to be updated with new level information 1104.

The batches selected for clustering 1106 includes an indication of one or more micro-batches that have been selected to be reclustered by the clustering component 712. The one or more micro-batches may be determined based on a priority for reclustering the database table, a priority for reclustering a certain level of a database table, and/or a priority for reclustering a certain micro-batch of the database table.

The global clustering information 1108 may include user-set parameters for clustering database data and/or statistics for which data is most commonly queried or retrieved. For example, the global clustering information 1108 may include statistics about which data is most commonly queried, and these statistics may be used to determine how a table should be clustered.

Figure 12:
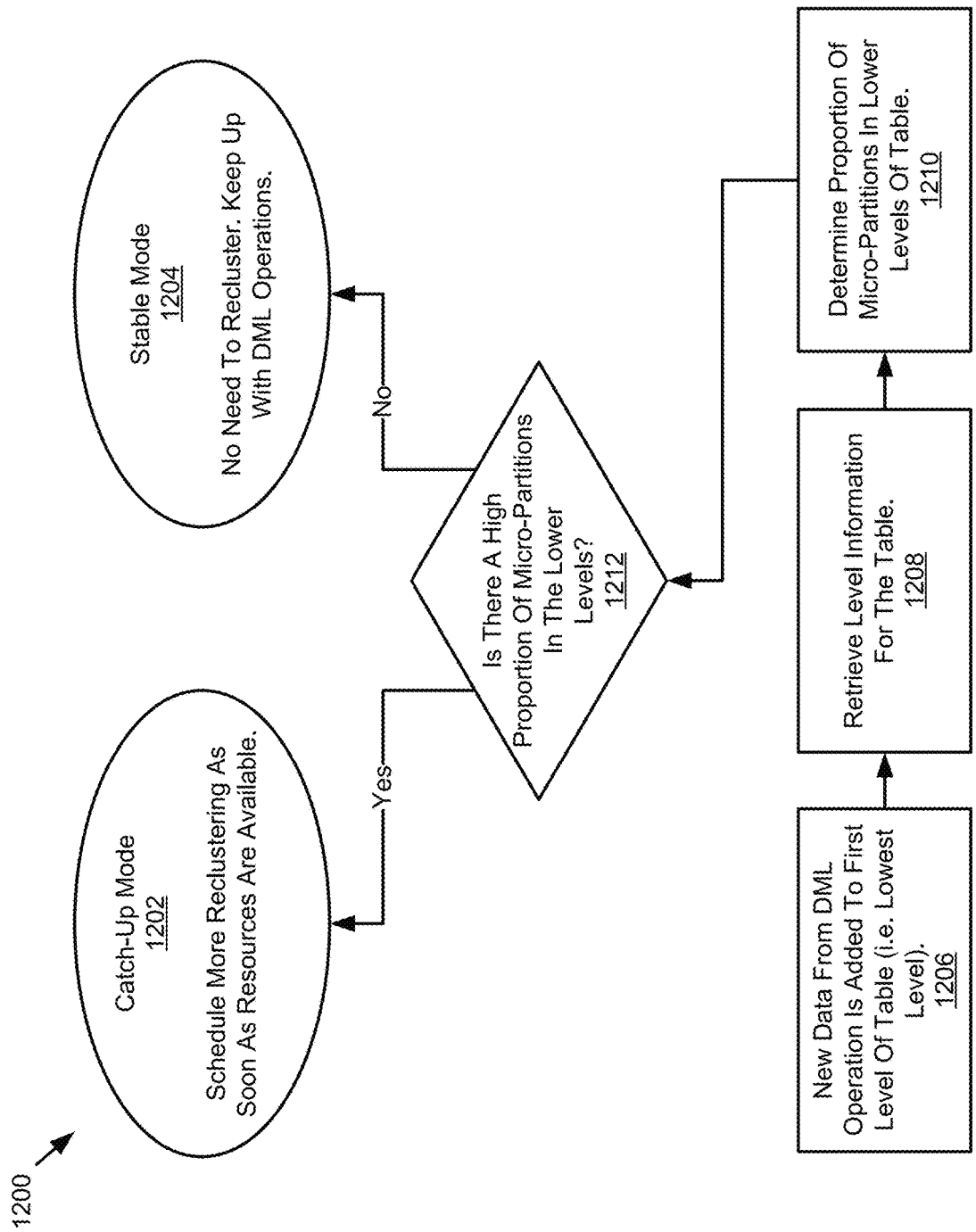
FIG. 12 is a schematic block diagram illustrating a process flow for characterizing a database table, according to embodiments of the disclosure.

FIG. 12 illustrates a schematic block diagram of a process flow 1200 for characterizing a database table. The database table may be characterized as being in the catch-up mode 1202 or the stable mode 1204. In the catch-up mode 1202, the database table has not yet reached a desired clustering level. The database table will be scheduled for additional reclustering as soon as computing resources are available. In the stable mode 1204, the database table has reached a desired clustering level and is in "stable" condition. The database table need only keep up with DML, operations. In an embodiment where there are no DML operations occurring on the database table, the database table will not need to be reclustered.

The process flow 1200 includes receiving partitions from a DML operation and adding the new partitions to the first level (i.e. the lowest level) of the database table at 1206. The process flow 1200 includes retrieving level information for the database table at 1208. The process flow 1200 includes determining a proportion of partitions that are within the lower levels of the database table at 1210. The process flow 1200 includes a determination of whether there is a high proportion of partitions in the lower levels of the database table at 1212. If a high proportion of the database partitions are within the lower levels (as determined at 1212), then the database table is characterized as being in the catch-up mode 1202. If there is not a high proportion of database partitions within the lower levels (as determined at 1212), then the database table is characterized as being in the stable mode 1204.

In an embodiment, a database table is assigned a reclustering priority. The reclustering priority indicates how imperative it is that the database table be reclustered, and the reclustering priority may be compared against other reclustering priorities for other database tables to determine an order in which the database tables should be reclustered. The reclustering priority may be based on how well the table is currently clustered and how much activity (for example, processing DML operations) has occurred on the database table since the last reclustering of the database table.

The system may determine a good approximation of each of (1) how well the table is currently reclustered and (2) an amount DML operations activity that has occurred on the database table since the last reclustering based on the level information for the database table. Given the same global clustering ratio for all database tables, the larger a proportion of partitions of the table are in the lower level e.g. level zero, the higher priority the table is for undergoing a reclustering operation. New partitions since the last DML operation are always added to the first level e.g. level zero of the database table, and thus the DML operations activity is considered by looking at the level information for the database table. The fewer the number of partitions within the lower levels, the less efficient additional reclustering will be and the lower the priority the table will be for undergoing a reclustering operation. The system may further deduce whether to stop reclustering based on predicate pruning effectiveness information. If the predicate pruning effectiveness 404 in the compiler is very close to the actual pruning effectiveness in the execution engine, the priority of the table for undergoing a reclustering operation will be very low.

In an embodiment, the clustering algorithm runs in a separate global services cluster. To achieve cache affinity, each database table is mapped to a target global service instance. The systems, methods, and devices as disclosed may further migrate table to different global service instances in the case of adding or removing global services from the cluster as well as during release.

In an embodiment, a clustering service operated by a task execution framework consists of two types of tasks, including partition selections jobs and recluster execution tasks. The partition selections tasks and recluster execution tasks are decoupled from one another and are scheduled separately. Initially, when a new clustered database table is added to a database, the database table is added to a queue of tables to work on. A partition selection task will run first and select one or more micro-batches for follow-up recluster execution tasks. The database table may be added back to the queue where the existing batchset comprising one or more micro-batches (see e.g. the micro-batches determined at 914) is finished. Thus, after the batchset no longer has any micro-batches that have not been reclustered, the database table is returned to the queue to perform further partition selection.

Additionally, the database table may be added back to the queue after DML operations occur on the table. In an embodiment where the DML operation includes a merge command, an update command, and/or a delete command, one or more micro-batches (see e.g. the micro-batches determined at 914) which are no longer valid are removed from the existing batchset. In an embodiment where the DML operation includes an insert command and/or a copy command, the partition selection will periodically generate an additional batchset to perform small partition compaction.

For DML operations, a trigger mechanism may be implemented. The trigger mechanism sends a REST call to the clustering service upon DML commit of clustered database tables. The trigger mechanism could also piggy-back on other background maintenance tasks for operations with a latency guarantee. In an embodiment where a trigger mechanism is not used, the clustering service may periodically read the tail of the transaction log by performing a range scan on a metadata store and may then update the impacted database tables.

In an embodiment, a system includes a separate scheduler for execution tasks. The scheduler selects the next database table to run based on the priority of the database table for undergoing a reclustering operation, along with some equity guarantees. For example, to achieve equitable distribution of computing resources across a plurality of database tables, a system may utilize weighted queuing. The system may adjust the urgency of reclustering a database table to ensure that high priority database tables are reclustered.

Figure 13:
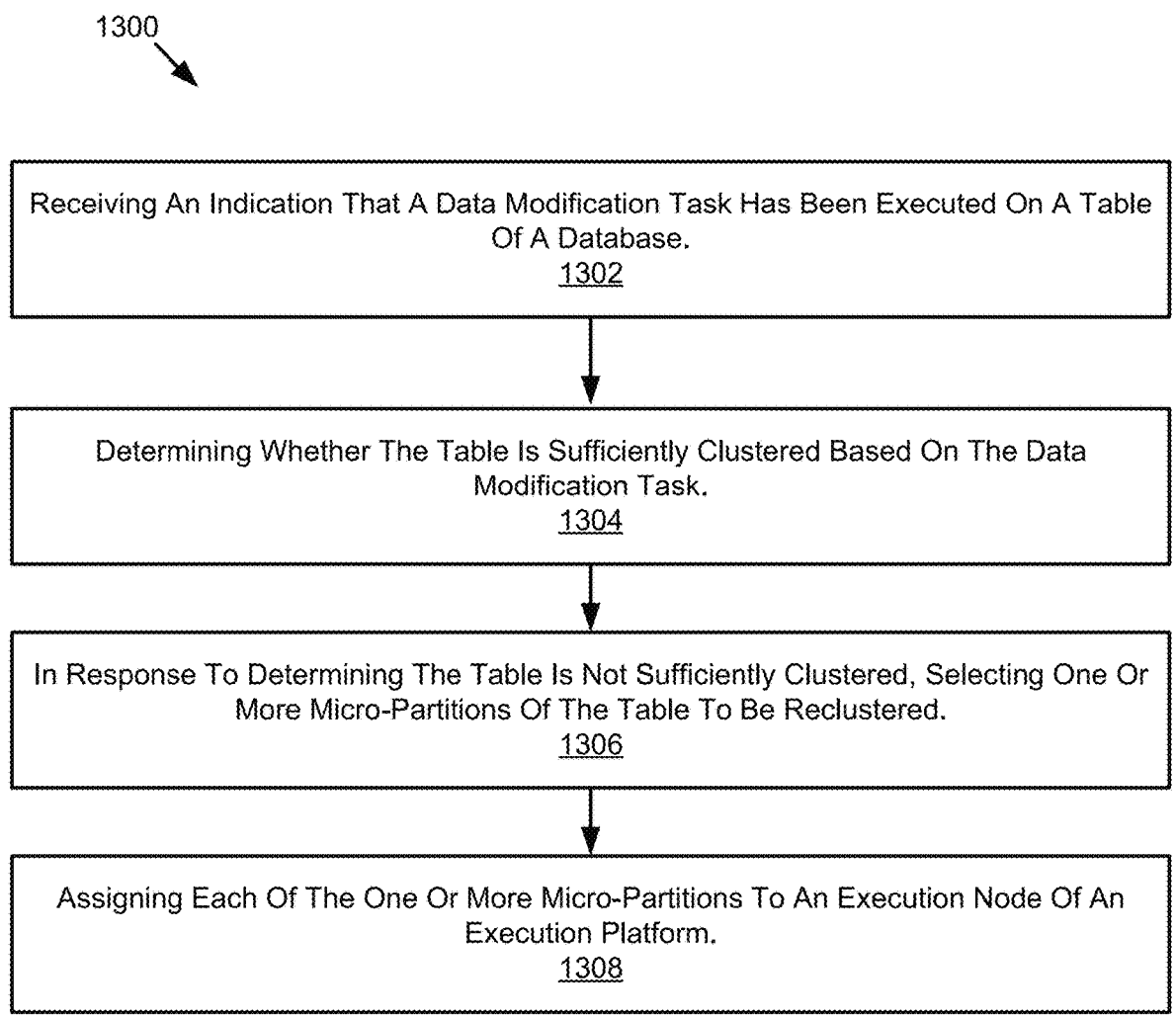
FIG. 13 is a schematic flow chart diagram of a method for reclustering a table of a database, according to embodiments of the disclosure.

FIG. 13 illustrates a schematic flow chart diagram of a method 1300 for automatic reclustering of a database table. The method 1300 can be performed by any suitable computing device such as a server, a compute service manager (see 1402), and execution platform (see 1416), a virtual warehouse manager (see 1520), a clustering maintenance module (see 700), and so forth. The method 1300 begins and a computing device receives at 1302 an indication that a data modification task has been executed on a table. In an embodiment, the data modification task includes an update command, a delete command, and or an insert command. In an embodiment, the data modification task includes ingesting new data into the table. The method 1300 continues and a computing device determines at 1304 whether the table is sufficiently clustered based on the data modification task. The method 1300 continues and a computing device, in response to determining the table is not sufficiently clustered, selects at 1306 one or more micro-partitions of the table to be reclustered. The micro-partitions of the table constitute immutable storage devices that cannot be updated in-place. The method 1300 continues and a computing device assigns at 1308 each of the one or more micro-partitions to an execution node of an execution platform.

Figure 14:
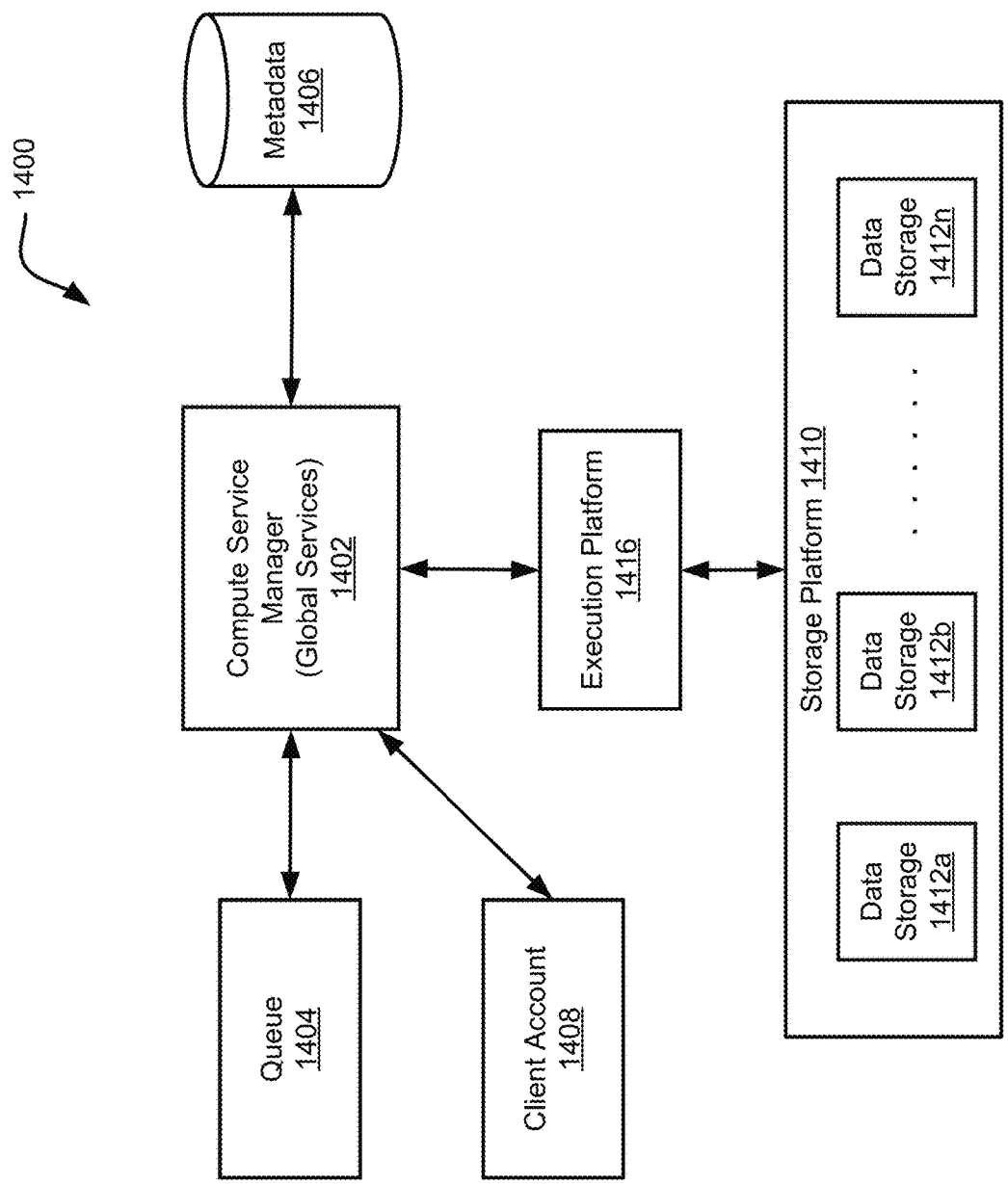
FIG. 14 is a block diagram illustrating a processing platform for a database system, according to embodiments of the disclosure.

FIG. 14 is a block diagram depicting an example embodiment of a data processing platform 1400. As shown in FIG. 14, a compute service manager 1402 is in communication with a queue 1404, a client account 1408, metadata 1406, and an execution platform 1416. In an embodiment, the compute service manager 1402 does not receive any direct communications from a client account 1408 and only receives communications concerning jobs from the queue 1404. In such an embodiment, the compute service manager 1402 may be configured to perform only "internal" database tasks that do not include queries received from client accounts. Such internal tasks may include, for example, reclustering tables as disclosed herein, updating materialized views, refreshing metadata, and so forth. In particular implementations, the compute service manager 1402 can support any number of client accounts such as end users providing data storage and retrieval requests, system administrators managing the systems and methods described herein, and other components/devices that interact with compute service manager 1402. As used herein, compute se manager 1402 may also be referred to as a "global services system" that performs various functions as discussed herein.

The compute service manager 1402 is in communication with a queue 1404. The queue 1404 may provide a job to the compute service manager 1402 in response to a trigger event. One or more jobs may be stored in the queue 1404 in an order of receipt and/or an order of priority, and each of those one or more jobs may be communicated to the compute service manager 1402 to be scheduled and executed. The queue 1404 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth. In an embodiment, the queue 1404 includes entries for refreshing a materialized view. The queue 1404 may include entries for refreshing a materialized view that is generated over a local source table (i.e. local to the same account operating the compute service manager 1402) and/or refreshing a materialized view that is generated over a shared source table that is managed by a different account.

The compute service manager 1402 is also coupled to metadata 1406, which is associated with the entirety of data stored throughout data processing platform 1400. In some embodiments, metadata 1406 includes a summary of data stored in remote data storage systems as well as data available from a local cache. Additionally, metadata 1406 may include information regarding how data is organized in the remote data storage systems and the local caches. Metadata 1406 allows systems and services to determine whether a piece of data needs to be accessed without loading or accessing the actual data from a storage device.

In an embodiment, the compute service manager 1402 and/or the queue 1404 may determine that a job should be performed based on the metadata 1406. In such an embodiment, the compute service manager 1402 and/or the queue 1404 may scan the metadata 1406 and determine that a job should be performed to improve data organization or database performance. For example, the compute service manager 1402 and/or the queue 1404 may determine that a new version of a source table for a materialized view has been generated and the materialized view has not been refreshed to reflect the new version of the source table. The metadata 1406 may include a transactional change tracking stream indicating when the new version of the source table was generated and when the materialized view was last refreshed. Based on that data 1406 transaction stream, the compute service manager 1402 and/or the queue 1404 may determine that a job should be performed. In an embodiment, the compute service manager 1402 determines that a job should be performed based on a trigger event and stores the job in the queue 1404 until the compute service manager 1402 is ready to schedule and manage the execution of the job. In an embodiment of the disclosure, the compute service manager 1402 determines whether a table needs to be reclustered based on DML command being performed, wherein the DML command constitutes the trigger event.

The compute service manager 1402 may receive rules or parameters from the client account 1408 and such rules or parameters may guide the compute service manager 1402 in scheduling and managing internal jobs. The client account 1408 may indicate that internal jobs should only be executed at certain times or should only utilize a set maximum amount of processing resources. The client account 1408 may further indicate one or more trigger events that should prompt the compute service manager 1402 to determine that a job should be performed. The client account 1408 may provide parameters concerning how many times a task may be re-executed and/or when the task should be re-executed.

The compute service manager 1402 is further coupled to an execution platform 1416, which provides multiple computing resources that execute various data storage and data retrieval tasks, as discussed in greater detail below. Execution platform 1416 is coupled to multiple data storage devices 1412a, 1412b, and 1412n that are part of a storage platform 1410. Although three data storage devices 1412a, 1412b, and 1412n are shown in FIG. 14, execution platform 1416 is capable of communicating with any number of data storage devices. In some embodiments, data storage devices 1412a, 1412b, and 1412n are cloud-based storage devices located in one or more geographic locations. For example, data storage devices 1412a, 1412b, and 1412n may be part of a public cloud infrastructure or a private cloud infrastructure. Data storage devices 1412a, 1412b, and 1412n may be hard disk drives (HDDs), solid state drives (SSDs), storage clusters, Amazon S3™ storage systems or any other data storage technology. Additionally, storage platform 1410 may include distributed file systems (such as Hadoop Distributed File Systems (HDFS)), object storage systems, and the like.

In particular embodiments, the communication links between compute service manager 1402, the queue 1404, metadata 1406, the client account 1408, and the execution platform 1416 are implemented via one or more data communication networks. Similarly, the communication links between execution platform 1416 and data storage devices 1412a-1412n in the storage platform 1410 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 14, data storage devices 1412a, 1412b, and 1412n are decoupled from the computing resources associated with the execution platform 1416. This architecture supports dynamic changes to data processing platform 1400 based on the changing data storage/retrieval needs as well as the changing needs of the users and systems accessing data processing platform 1400. The support of dynamic changes allows data processing platform 1400 to scale quickly in response to changing demands on the systems and components within data processing platform 1400. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Compute service manager 1402, queue 1404, metadata 1406, client account 1408, execution platform 1416, and storage platform 1410 are shown in FIG. 14 as individual components. However, each of compute service manager 1402, queue 1404, metadata 1406, client account 1408, execution platform 1416, and storage platform 1410 may be implemented as a distributed system (e.g., distributed across multiple systems/platforms at multiple geographic locations). Additionally, each of compute service manager 1402, metadata 1406, execution platform 1416, and storage platform 1410 can be scaled up or down (independently of one another) depending on changes to the requests received from the queue 1404 and/or client accounts 208 and the changing needs of data processing platform 1400. Thus, in the described embodiments, data processing platform 1400 is dynamic and supports regular changes to meet the current data processing needs.

During typical operation, data processing platform 1400 processes multiple jobs received from the queue 1404 or determined by the compute service manager 1402. These jobs are scheduled and managed by the compute service manager 1402 to determine when and how to execute the job. For example, the compute service manager 1402 may divide the job into multiple discrete tasks and may determine what data is needed to execute each of the multiple discrete tasks. The compute service manager 1402 may assign each of the multiple discrete tasks to one or more nodes of the execution platform 1416 to process the task. The compute service manager 1402 may determine what data is needed to process a task and further determine which nodes within the execution platform 1416 are best suited to process the task. Some nodes may have already cached the data needed to process the task and, therefore, be a good candidate for processing the task. Metadata 1406 assists the compute service manager 1402 in determining which nodes in the execution platform 1416 have already cached at least a portion of the data needed to process the task. One or more nodes in the execution platform 1416 process the task using data cached by the nodes and, if necessary, data retrieved from the storage platform 1410. It is desirable to retrieve as much data as possible from caches within the execution platform 1416 because the retrieval speed is typically much faster than retrieving data from the storage platform 1410.

As shown in FIG. 14, the data processing platform 1400 separates the execution platform 1416 from the storage platform 1410. In this arrangement, the processing resources and cache resources in the execution platform 1416 operate independently of the data storage resources 1412a-1412n in the storage platform 1410. Thus, the computing resources and cache resources are not restricted to specific data storage resources 1412a-1412n. Instead, all computing resources and all cache resources may retrieve data from, and store data to, any of the data storage resources in the storage platform 1410. Additionally, the data processing platform 1400 supports the addition of new computing resources and cache resources to the execution platform 1416 without requiring any changes to the storage platform 1410. Similarly, the data processing platform 1400 supports the addition of data storage resources to the storage platform 1410 without requiring any changes to nodes in the execution platform 1416.

Figure 15:
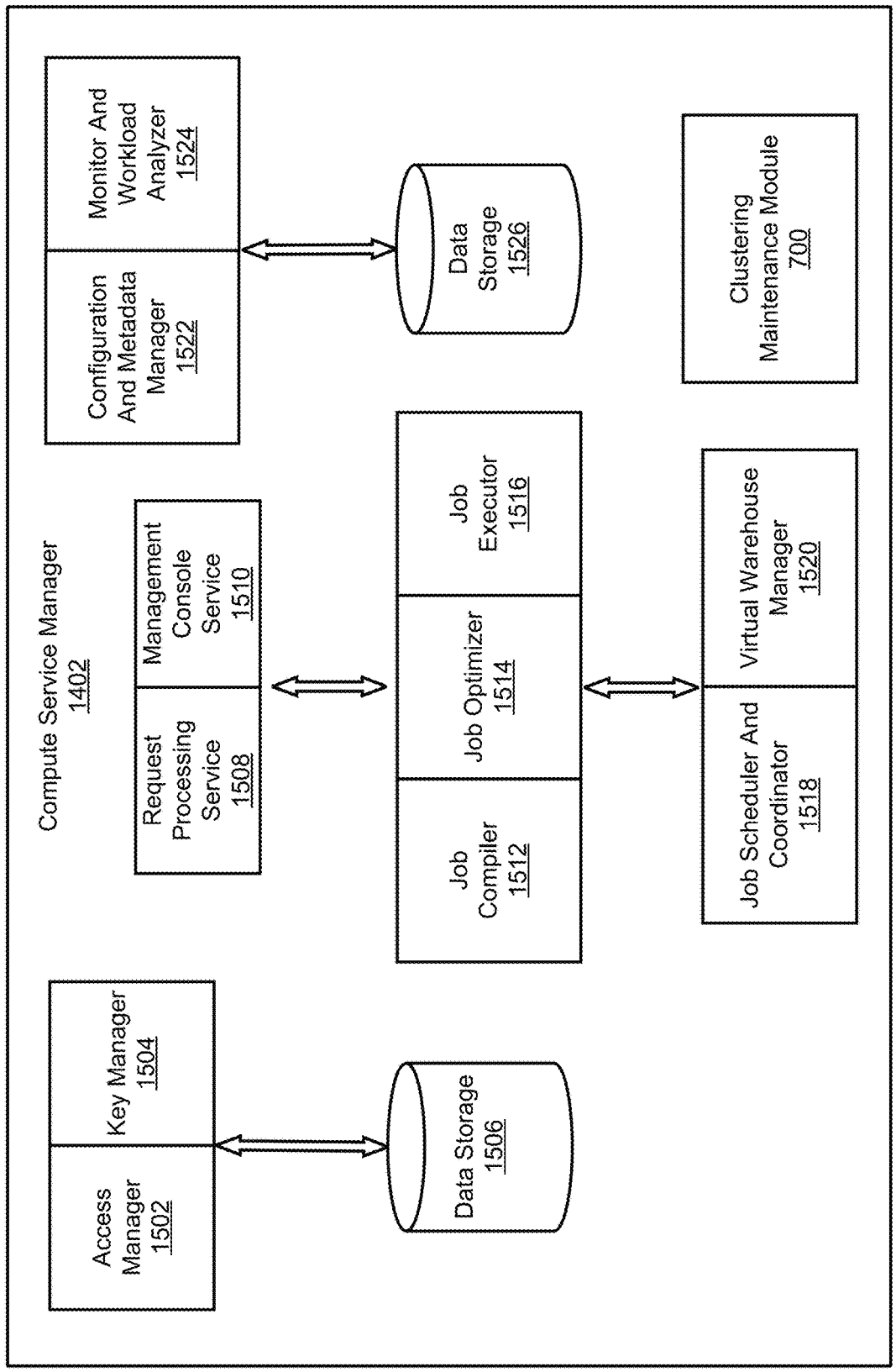
FIG. 15 is a block diagram illustrating components of a compute service manager, according to embodiments of the disclosure.

FIG. 15 is a block diagram depicting an embodiment of the compute service manager 1402. As shown in FIG. 15, the compute service manager 1402 includes an access manager 1502 and a key manager 1504 coupled to a data storage device 1506. Access manager 1502 handles authentication and authorization tasks for the systems described herein. Key manager 1504 manages storage and authentication of keys used during authentication and authorization tasks. For example, access manager 1502 and key manager 1504 manage the keys used to access data stored in remote storage devices (e.g., data storage devices in storage platform 1410). As used herein, the remote storage devices may also be referred to as "persistent storage devices" or "shared storage devices." A request processing service 1508 manages received data storage requests and data retrieval requests (e.g., jobs to be performed on database data). For example, the request processing service 1508 may determine the data necessary to process the received data storage request or data retrieval request. The necessary data may be stored in a cache within the execution platform 1416 (as discussed in greater detail below) or in a data storage device in storage platform 1410. A management console service 1510 supports access to various systems and processes by administrators and other system managers. Additionally, the management console service 1510 may receive a request to execute a job and monitor the workload on the system.

The compute service manager 1402 also includes a job compiler 1512, a job optimizer 1514 and a job executor 1510. The job compiler 1512 parses a job into multiple discrete tasks and generates the execution code for each of the multiple discrete tasks. The job optimizer 1514 determines the best method to execute the multiple discrete tasks based on the data that needs to be processed. The job optimizer 1514 also handles various data pruning operations and other data optimization techniques to improve the speed and efficiency of executing the job. The job executor 1516 executes the execution code for jobs received from the queue 1404 or determined by the compute service manager 1402.

A job scheduler and coordinator 1518 sends received jobs to the appropriate services or systems for compilation, optimization, and dispatch to the execution platform 1416. For example, jobs may be prioritized and processed in that prioritized order. In an embodiment, the job scheduler and coordinator 1518 determines a priority for internal jobs that are scheduled by the compute service manager 1402 with other "outside" jobs such as user queries that may be scheduled by other systems in the database but may utilize the same processing resources in the execution platform 1416. In some embodiments, the job scheduler and coordinator 1518 identifies or assigns particular nodes in the execution platform 1416 to process particular tasks. A virtual warehouse manager 1520 manages the operation of multiple virtual warehouses implemented in the execution platform 1416. As discussed below, each virtual warehouse includes multiple execution nodes that each include a cache and a processor.

Additionally, the compute service manager 1402 includes a configuration and metadata manager 1522, which manages the information related to the data stored in the remote data storage devices and in the local caches (i.e., the caches in execution platform 1416). As discussed in greater detail below, the configuration and metadata manager 1522 uses the metadata to determine which data micro-partitions need to be accessed to retrieve data for processing a particular task or job. A monitor and workload analyzer 1524 oversee processes performed by the compute service manager 1402 and manages the distribution of tasks (e.g., workload) across the virtual warehouses and execution nodes in the execution platform 1416. The monitor and workload analyzer 1524 also redistribute tasks, as needed, based on changing workloads throughout the data processing platform 1400 and may further redistribute tasks based on a user (i.e. "external") query workload that may also be processed by the execution platform 1416. The configuration and metadata manager 1522 and the monitor and workload analyzer 1524 are coupled to a data storage device 1526. Data storage devices 1506 and 1526 in FIG. 15 represent any data storage device within data processing platform 1400. For example, data storage devices 1506 and 1526 may represent caches in execution platform 1416, storage devices in storage platform 1410, or any other storage device.

The compute service manager 1402 also includes a clustering maintenance module 700 as disclosed herein. The clustering maintenance module 700 is configured to identify and schedule reclustering operations for a table.

Figure 16:
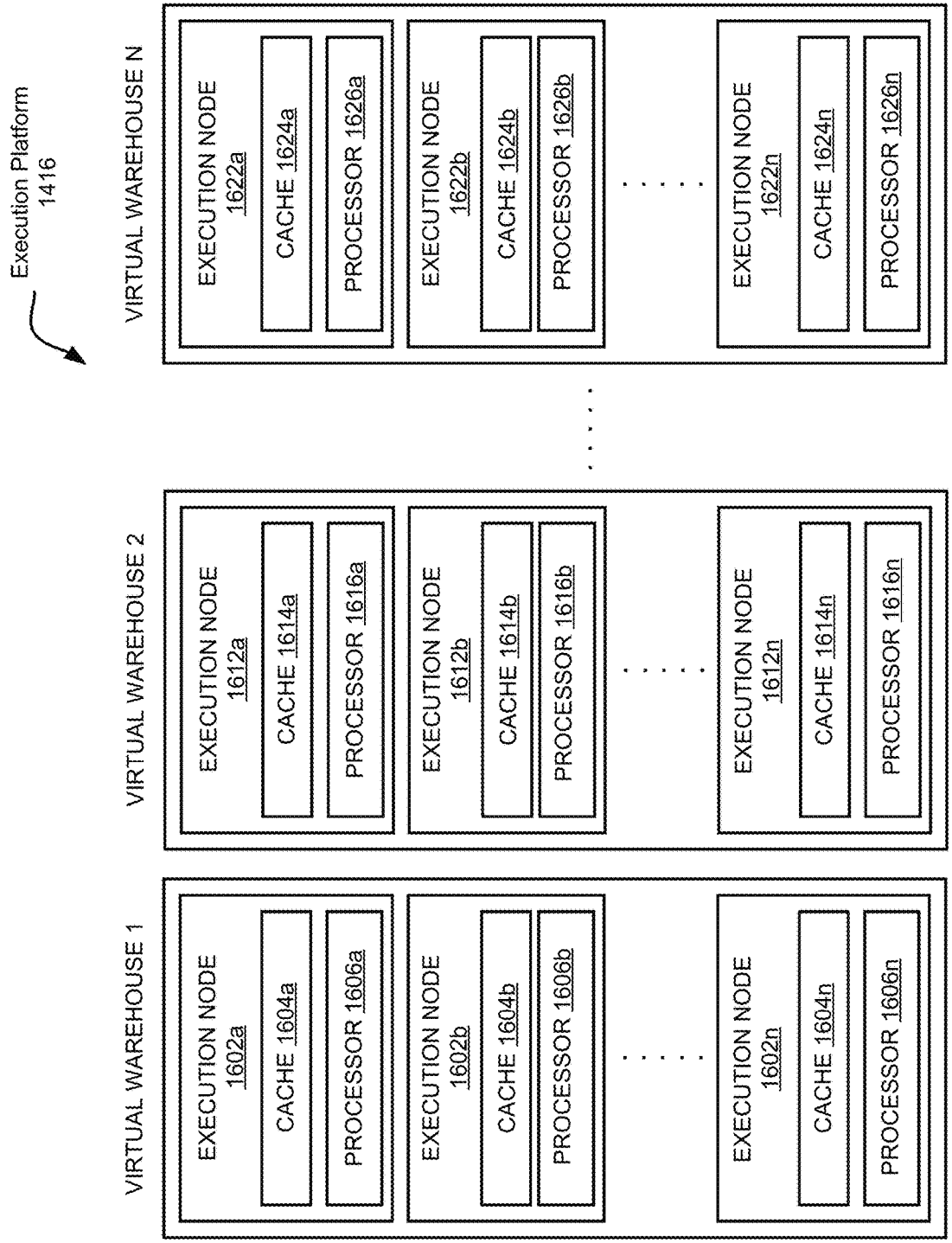
FIG. 16 is a block diagram of an execution platform, according to embodiments of the disclosure.

FIG. 16 is a block diagram depicting an embodiment of an execution platform 1416. As shown in FIG. 16, execution platform 1416 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 1416 can add new virtual warehouses and drop existing virtual warehouses in real-time based on the current processing needs of the systems and users. This flexibility allows the execution platform 1416 to quickly deploy large amounts of computing resources when needed without being forced to continue paying for those computing resources when they are no longer needed. All virtual warehouses can access data from any data storage device (e.g., any storage device in storage platform 1410).

Although each virtual warehouse shown in FIG. 16 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1412a-1412n shown in FIG. 14. Thus, the virtual warehouses are not necessarily assigned to a specific data storage device 1412a-1412n and, instead, can access data from any of the data storage devices 1412a-1412n within the storage platform 1410. Similarly, each of the execution nodes shown in FIG. 16 can access data from any of the data storage devices 1412a-1412n. In some embodiments, a particular virtual warehouse or a particular execution node may be temporarily assigned to a specific data storage device, but the virtual warehouse or execution node may later access data from any other data storage device.

In the example of FIG. 16, virtual warehouse 1 includes three execution nodes 1602a, 1602b, and 1602n. Execution node 1602a includes a cache 1604a and a processor 1606a. Execution node 1602b includes a cache 1604b and a processor 1606b. Execution node 1602n includes a cache 1604n and a processor 1606n. Each execution node 1602a, 1602b, and 1602n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual house 2 includes three execution nodes 1612a, 1612b, and 1612n. Execution node 1612a includes a cache 1614a and a processor 1616a. Execution node 1612n includes a cache 1614n and a processor 1616n. Execution node 1612n includes a cache 1614n and a processor 1616n. Additionally, virtual warehouse 3 includes three execution nodes 1622a, 1622b, and 1622n. Execution node 1622a includes a cache 1624a and a processor 1626a. Execution node 1622b includes a cache 1624b and a processor 1626b. Execution node 1622n includes a cache 1624n and a processor 1626n.

In some embodiments, the execution nodes shown in FIG. 16 are stateless with respect to the data the execution nodes are caching. For example, these execution nodes do not store or otherwise maintain state information about the execution node, or the data being cached by a particular execution node. Thus, the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 16 each include one data cache and one processor, alternate embodiments may include execution nodes containing any number of processors and any number of caches. Additionally, the caches may vary in size among the different execution nodes. The caches shown in FIG. 16 store, in the local execution node, data that was retrieved from one or more data storage devices in storage platform 1410. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 1410.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execration node may be assigned more cache resources if the tasks performed by the execution node require a larger cache capacity.

Although virtual warehouses 1, 2, and n are associated with the same execution platform 1416, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 16 as having multiple execution nodes. The multiple execution nodes associated with each virtual warehouse may be implemented using multiple computing systems at multiple geographic locations. For example, an instance of virtual warehouse 1 implements execution nodes 1602a and 1602b on one computing platform at a geographic location and implements execution node 1602n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 1416 is also fault tolerant. For example, if one virtual warehouse fails, that virtual warehouse is quickly replaced with a different virtual warehouse at a different geographic location.

A particular execution platform 1416 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 1410, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In an embodiment, distinct execution platforms 1416 are allocated to different accounts in the multiple tenant database. This can ensure that data stored in cache in the distinct execution platforms 1416 is made accessible only to the associated account. The size of each distinct execution platform 1416 can be tailored to the processing needs of each account in the multiple tenant database. In an embodiment, a provider account has its own execution platform 1416 and a receiver account has its own execution platform 1416. In an embodiment, a receiver account receives a share object from the provider account that enables the receiver account to generate a materialized view over data owned by the provider account. The execution platform 1416 of the receiver account may generate the materialized view. When an update is made to the source table for the materialized view (i.e. the data owned by the provider account), the execution platform 1416 of the provider account will execute the update. If the receiver account generated the materialized view, then the execution platform 1416 of the receiver account may be responsible for refreshing the materialized view with respect to its source table.

Figure 17:
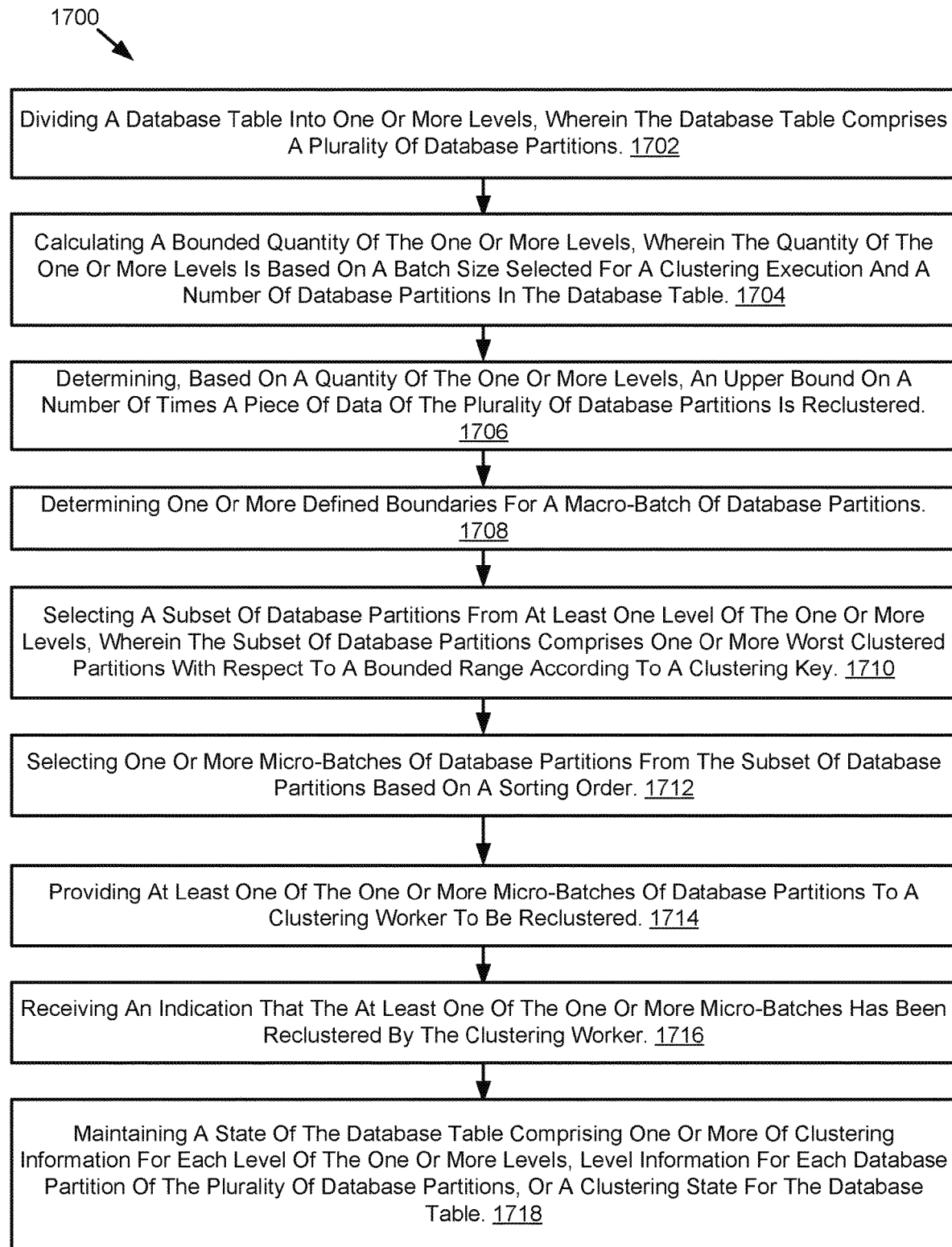
FIG. 17 is a schematic flow chart diagram of a method for reclustering of a database table, according to embodiments of the disclosure.

FIG. 17 illustrates a schematic flow chart diagram of a method 1700 for automatic reclustering of a database table. The method 1700 can be performed by any suitable computing device such as a server, a compute service manager (see 1402), and execution platform (see 1416), a virtual warehouse manager (see 1520), a clustering maintenance module (see 700), and so forth. The method 1700 begins and a computing device divides at 1702 a database table into one or more levels, wherein the database table comprises a plurality of database partitions. The computing device calculates at 1704 a bounded quantity of the one or more levels, wherein the quantity of the one or more levels is based on a batch size selected for a clustering execution and a number of database partitions in the database table. The computing device determines at 1706, based on a quantity of the one or more levels, an upper bound on a number of times a piece of data of the plurality of database partitions is reclustered. The computing device determines at 1708 one or more defined boundaries for a subset of database partitions. The computing device selects at 1710 a subset of database partitions from at least one level of the one or more levels, wherein the subset of database partitions comprises one or more worst clustered partitions with respect to a bounded range according to a clustering key. The computing device selects at 1712 one or more micro-batches of database partitions form the subset of database partitions based on a sorting order. The computing device provides at 1714 at least one of the one or more micro-batches of database partitions to a clustering worker to be reclustered. The computing device receives at 1716 an indication that at least one of the one or more micro-batches has been reclustered by the clustering worker. The computing device maintains at 1718 a state of the database table comprising one or more of clustering information for each level of the one or more levels, level information for each database partition of the plurality of database partitions, or a clustering state for the database table.

Figure 18:
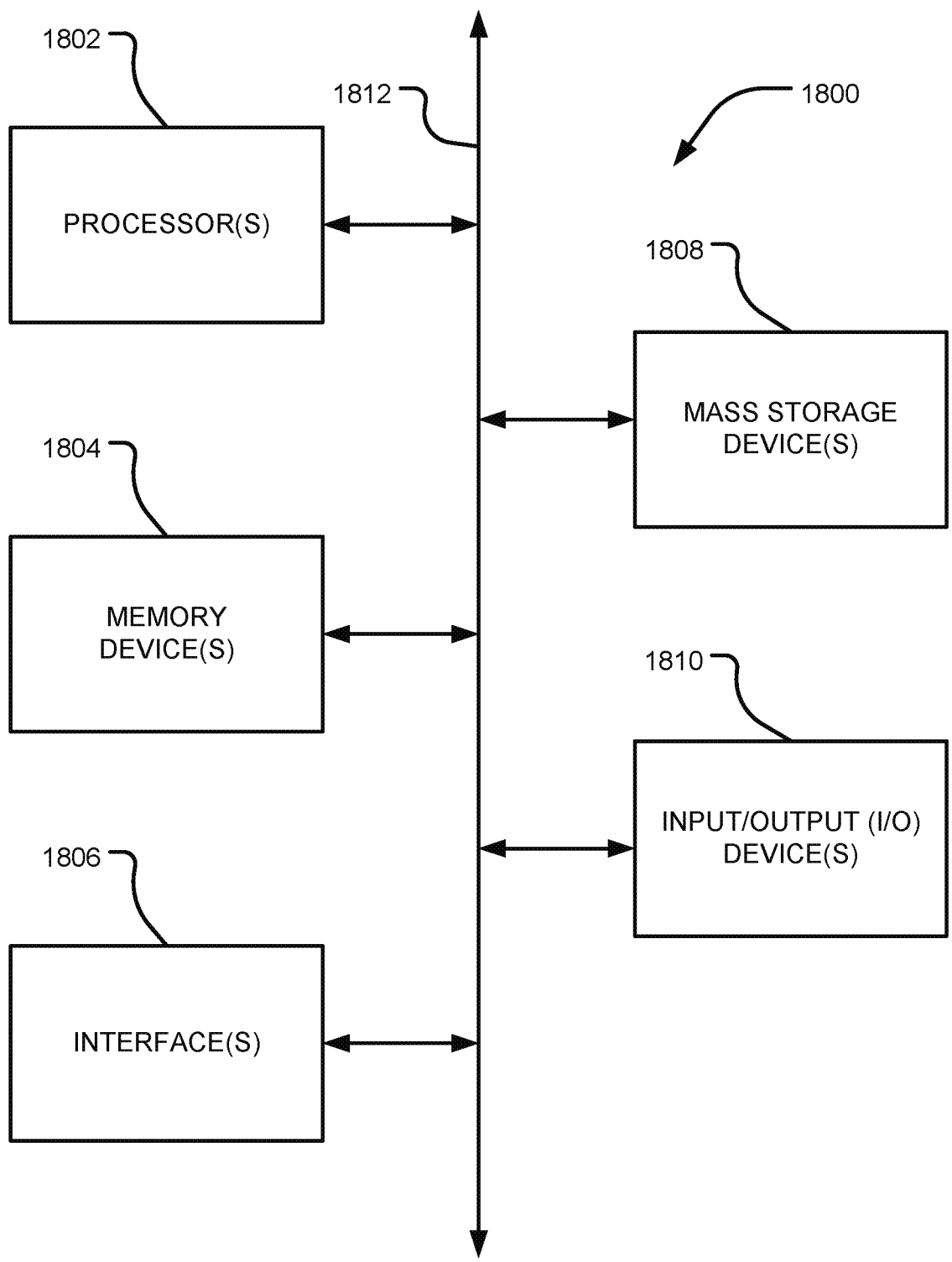
FIG. 18 is a schematic diagram of an example computing device, according to embodiments of the disclosure.

FIG. 18 is a block diagram depicting an example computing device 1800. In some embodiments, computing device 1800 is used to implement one or more of the systems and components discussed herein. Further, computing device 1800 may interact with any of the systems and components described herein. Accordingly, computing device 1800 may be used to perform various procedures and tasks, such as those discussed herein. Computing device 1800 can function as a server, a client or any other computing entity. Computing device 1800 can be any of a wide variety of computing devices, such as a desktop computer, a notebook computer, a server computer, a handheld computer, a tablet, and the like.

Computing device 1800 includes one or more processor(s) 1802, one or more memory device(s) 1804, one or more interface(s) 1806, one or more mass storage device(s) 1808, and one or more input/Output (I/O) device(s) 1810, all of which are coupled to a bus 1812. Processor(s) 1802 include one or more processors or controllers that execute instructions stored in memory device(s) 1804 and/or mass storage device(s) 1808. Processor(s) 1802 may also include various types of computer-readable media, such as cache memory.

Memory device(s) 1804 include various computer-readable media, such as volatile memory (e.g., random access memory (RAM)) and/or nonvolatile memory (e.g., read-only memory (ROM)). Memory device(s) 1804 may also include rewritable ROM, such as Flash memory.

Mass storage device(s) 1808 include various computer readable media, such as magnetic tapes, magnetic disks, optical disks, solid state memory (e.g., Flash memory), and so forth. Various drives may also be included in mass storage device(s) 1808 to enable reading from and/or writing to the various computer readable media. Mass storage device(s) 1808 include removable media and/or non-removable media.

I/O device(s) 1810 include various devices that allow data and/or other information to be input to or retrieved from computing device 1800. Example I/O device(s) 1810 include cursor control devices, keyboards, keypads, microphones, monitors or other display devices, speakers, printers, network interface cards, modems, lenses, CCDs or other image capture devices, and the like.

Interface(s) 1806 include various interfaces that allow computing device 1800 to interact with other systems, devices, or computing environments. Example interface(s) 1806 include any number of different network interfaces, such as interfaces to local area networks (LANs), wide area networks (WANs), wireless networks, and the Internet.

Bus 1812 allows processor(s) 1802, memory device(s) 1804, interface(s) 1806, mass storage device(s) 1808, and I/O device(s) 1810 to communicate with one another, as well as other devices or components coupled to bus 1812. Bus 1812 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1800 and are executed by processor(s) 1802. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein.

EXAMPLES

The following examples pertain to further embodiments.

Example 1 is a method of automatic reclustering of a database table. The method includes dividing a database table into one or more levels, wherein the database table comprises a plurality of database partitions. The method includes selecting a subset of database partitions from at least one level of the one or more levels, wherein the subset of database partitions comprises one or more worst clustered partitions with respect to a bounded range according to a clustering key. The method includes selecting one or more micro-batches of database partitions from the subset of database partitions based on a sorting order. The method includes providing at least one of the one or more micro-batches of database partitions to a clustering worker to be reclustered.

Example 2 is a method as in Example 1, further comprising calculating a quantity of the one or more levels such that the quantity of the one or more levels is bounded, and wherein the quantity of the one or more levels is calculated based on a batch size selected for a clustering execution and a number of database partitions in the database table.

Example 3 is a method as in any of Examples 1-2, further comprising determining, based on the quantity of the one or more levels, an upper bound on a number of times a piece of data of the plurality of database partitions is reclustered.

Example 4 is a method as in any of Examples 1-3, wherein the piece of data of the plurality of database partitions is reclustered at most a number of times equal to the quantity of the one or more levels.

Example 5 is a method as in any of Examples 1-4, wherein the sorting order sorts the subset of database partitions based on clustering key metadata.

Example 6 is a method as in any of Examples 1-5, further comprising: determining one or more defined boundaries for the subset of database partitions; wherein selecting the subset of database partitions comprises selecting only those database partitions that fit within the one or more defined boundaries for the subset of database partitions.

Example 7 is a method as in any of Examples 1-6, wherein each of the one or more micro-batches of database partitions is independent such that the one or more micro-batches may be reclustered by clustering worker in an arbitrary order.

Example 8 is a method as in any of Examples 1-7, further comprising determining a priority for scheduling a reclustering of the database table based on a quantity of partitions contained in the one or more levels, wherein: reclustering of the database table is a higher priority if the database table comprises a high quantity of partitions in a low level of the one or more levels; reclustering of the database table is a lower priority if a majority of the plurality of partitions are located in a highest level of the one or more levels; and a new database partition created by a DML command is added to a lowest level of the one or more levels.

Example 9 is a method as in any of Examples 1-8, further comprising: receiving an indication that the at least one of the one or more micro-batches of database partitions has been reclustered by the clustering worker generate a clustered unit; and maintaining a state of the database table comprising one or more of: clustering information for each level of the one or more levels; level information for each database partition of the plurality of database partitions; or a clustering state for the database table.

Example 10 is a method as in any of Examples 1-9, further comprising, in response to receiving an indication that the at least one of the one or more micro-batches of database partitions has been reclustered by the clustering worker, generating a clustering state for the database table, wherein the clustering state comprises one or more of: a current clustering state for each of the one or more micro-batches of database partitions; a level information for each of the one or more micro-batches of database partitions; or a log indicating whether any micro-batches of the one or more micro-batches of database partitions are scheduled for clustering by the clustering worker.

Example 11 is a method as in any of Examples 1-10, wherein the clustering worker comprises a dedicated virtual warehouse configured to perform reclustering tasks, and wherein the at least one of the one or more micro-batches of database partitions is mapped to a target clustering worker selected from a plurality of clustering workers.

Example 12 is a method as in any of Examples 1-11, wherein: the selecting the one or more micro-batches of database partitions is decoupled from reclustering by the clustering worker the one or more micro-batches of database partitions; and the reclustering by the clustering worker is scheduled separately from the selecting the one or more micro-batches of database partitions.

Example 13 is a method as in any of Examples 1-12, further comprising: receiving a new database table; adding the new database table to a queue of tables to be reclustered; and selecting a batchset comprising one or more new micro-batches of new database partitions from the new database table; providing at least one of the one or more new micro-batches to a clustering worker to be reclustered; and automatically reclustering the new database table.

Example 14 is a method as in any of Examples 1-13, further comprising returning the new database table to the queue of tables to be reclustered based on one or more of: each of the one or more new micro-batches of the batchset has been reclustered by the clustering worker; or a DML operation occurred on the new database table, such that: if the DML operation comprises a merge command, an update command, or a delete command, the batchset is cleared and the batchset is regenerated; and if the DML operation comprises an insert command or a copy command, an additional batchset is generated to perform small partition compaction.

Example 15 is a method as in any of Examples 1-14, wherein the clustering worker comprises a plurality of clustering workers configured to concurrently recluster the one or more micro-batches of database partitions.

Example 16 is a method as in any of Examples 1-15, wherein the clustering worker comprises resources separate from a client virtual warehouse such that the clustering worker does not introduce resource contention with other production workloads of the client virtual warehouse.

Example 17 is a method as in any of Examples 1-16, wherein the clustering worker does not block a DML operation received from a client account.

Example 18 is a method as in any of Examples 1-17, wherein the dividing the database table into one or more levels is performed independently of and decoupled from the clustering worker reclustering the one or more micro-batches.

Example 19 is a method as in any of Examples 1-18, wherein the method is performed automatically without input from a client account.

Example 20 is non-transitory computer readable storage media storing instructions that, when executed by one or more processors, cause the one or more processors to: divide a database table into one or more levels, wherein the database table comprises a plurality of database partitions; select a subset of database partitions from at least one level of the one or more levels, wherein the subset of database partitions comprises one or more worst clustered partitions with respect to a bounded range according to a clustering key; select one or more micro-batches of database partitions from the subset of database partitions based on a sorting order; and provide at least one of the one or more micro-batches of database partitions to a clustering worker to be reclustered.

Example 21 is non-transitory computer readable storage media as in claim 20, wherein the instructions further cause the one or more processors to: determine one or more defined boundaries for the subset of database partitions; wherein selecting the subset of database partitions comprises selecting only those database partitions that fit within the one or more defined boundaries for the subset of database partitions.

Example 22 is non-transitory computer readable storage media as in any of Examples 20-21, wherein the instructions further cause the one or more processors to determine a priority for scheduling a reclustering of the database table based on a quantity of partitions contained in the one or more levels, wherein: reclustering the database table is a higher priority if the database table comprises a high quantity of partitions in a low level of the one or more levels; reclustering the database table a lower priority if a majority of the plurality of partitions are located in a highest level of the one or more levels; and a new database partition created by a DML command is added to a lowest level of the one or more levels.

Example 23 is non-transitory computer readable storage media as in any of Examples 20-22, wherein the instructions cause the one or more processors to select the subset of database partitions by gathering usage data on how a predicate is used in the database table and utilizing the usage data to determine a portion of the plurality of database partitions undergoing a high number of DML operations.

Example 24 is non-transitory computer readable storage media as in any of Examples 20-23, wherein the instructions further cause the one or more processors to: receive an indication that the at least one of the one or more micro-batches of database partitions has been reclustered by the clustering worker generate a clustered unit; and maintain a state of the database table comprising one or more of: clustering information for each level of the one or more levels; level information for each database partition of the plurality of database partitions; or a clustering state for the database table.

Example 25 is a system. The system includes means for dividing a database table into one or more levels, wherein the database table comprises a plurality of database partitions; means for selecting a subset of database partitions from at least one level of the one or more levels, wherein the subset of database partitions comprises one or more worst clustered partitions with respect to a bounded range according to a clustering key; means for selecting one or more micro-batches of database partitions from the subset of database partitions based on a sorting order; and means for providing at least one of the one or more micro-batches of database partitions to a clustering worker to be reclustered.

Example 26 is a system as in Example 25, further comprising: means for determining one or more defined boundaries for the subset of database partitions; wherein the means for selecting the subset of database partitions is configured to select only those database partitions that fit within the one or more defined boundaries for the subset of database partitions.

Example 27 is a system as in any of Examples 25, further comprising a means for determining a priority for scheduling a reclustering of the database table based on a quantity of partitions contained in the one or more levels, wherein: reclustering of the database table is a higher priority if the database table comprises a high quantity of partitions in a low level of the one or more levels; reclustering of the database table is a lower priority if a majority of the plurality of partitions are located in a highest level of the one or more levels; and a new database partition created by a DML command is added to a lowest level of the one or more levels.

Example 28 is a system as in any of Examples 25-27 wherein the means for selecting the subset of database partitions is configured to gather usage data on how a predicate is used in the database table and utilize the usage data to determine a portion of the plurality of database partitions undergoing a high number of DML operations.

Example 29 is a system as in any of Examples 25-28, wherein the system is isolated from a client virtual warehouse such that operations of the system do not interfere with a client DML operation.

Example 30 is a system as in any of Examples 25-29, wherein the clustering worker comprises a plurality of clustering workers configured to concurrently recluster the one or more micro-batches.

Example 31 is a system as in any of Examples 25-30, wherein the means for dividing the database table into one or more levels performs independently of and is decoupled from the clustering worker configured to recluster the one or more micro-batches.

Example 32 is a system as in any of Examples 25-31, further comprising: means for receiving an indication that the at least one of the one or more micro-batches of database partitions has been reclustered by the clustering worker to generate a clustered unit; and means for maintaining a state of the database table, wherein the state of the database table comprises one or more of: clustering information for each level of the one or more levels; level information for each database partition of the plurality of database partitions; or a clustering state for the database table.

Example 33 is a system or device that includes means for implementing a method, system, or device as in any of Examples 1-32.

Example 34 is a method. The method includes receiving an indication that a data modification task has been executed on a table and determining whether the table is sufficiently clustered. The method includes, in response to determining the table is not sufficiently clustered, selecting one or more micro-partitions of the table to be reclustered. The method includes assigning each of the one or more micro-partitions to an execution node to be reclustered.

Example 35 is a method as in Example 34, wherein determining whether the table is sufficiently clustered comprises assessing the data modification task to determine whether a sufficient number of rows has been added, a sufficient number of rows has been deleted, and/or a sufficient number of rows has been modified to necessitate the table be reclustered.

Example 36 is a method as in any of Examples 34-35, wherein selecting one or more micro-partitions of the table to be reclustered comprises: identifying a constant micro-partition having equivalent minimum and maximum values for a cluster key column; and removing the constant micro-partition from consideration such that the constant micro-partition is not included in the one or more micro-partitions to be reclustered.

Example 37 is a method as in any of Examples 34-36, wherein selecting the one or more micro-partitions of the table to be reclustered comprises: constructing a stabbing count array for the table; extracting minimum and maximum endpoints for each micro-partition in the stabbing count array; computing statistics on each of the minimum and maximum endpoints; and identifying one or more peaks in the stabbing count array that are taller than a predefined threshold.

Example 38 is a method as in any of Examples 34-37, wherein selecting the one or more micro-partitions of the table to be reclustered further comprises: sorting each of the one or more peaks in the stabbing count array based on height; identifying overlapping micro-partitions within each of the one or more peaks; and sorting the overlapping micro-partitions based on width.

Example 39 is a method as in any of Examples 34-38, wherein selecting the one or more micro-partitions of the table to be reclustered further comprises selecting based on which micro-partitions are within the tallest peaks of the one or more peaks and further based on which of the overlapping micro-partitions have the widest widths.

Example 40 is a method as in any of Examples 34-39, further comprising defining a budget for allocating processing resources to performing reclustering operations, and wherein the determining whether the table is sufficiently clustered is based at least in part on the budget.

Example 41 is a method as in any of Examples 34-39, further comprising partitioning the one or more micro-partitions of the table to be reclustered into one or more batches each comprising a grouping of micro-partitions to be reclustered.

Example 42 is a method as in any of Examples 34-41, wherein selecting the one or more micro-partitions of the table to be reclustered comprises: determining a maximum number of levels for the table based at least on a size of the table; dividing the table into levels; selecting a macro-batch of micro-partitions within each level, wherein the macro-batch centers around a single peak and comprises defined boundaries; and selecting micro-partitions from the macro-batch.

Example 43 is a method as in any of Examples 34-42, wherein the data modification task comprises ingesting new micro-partitions into the table and wherein determining whether the table is sufficiently clustered comprises: retrieving level information for the table; identifying a proportion of micro-partitions in lower levels of the table; determining whether a high proportion of micro-partitions are in the lower levels; in response to determining a high proportion of micro-partitions are not in the lower levels, entering a stable mode in which no reclustering operations will not be performed; and in response to determining a high proportion of micro-partitions are in the lower levels, entering a catch-up mode in which reclustering operations will be performed.

Example 44 is a system. The system includes a compute service manager for managing internal operations of a cloud-based database platform. The system includes a plurality of shared storage devices collectively storing database data, wherein the plurality of shared storage devices is independent of the compute service manager. The system includes an execution platform comprising a plurality of execution nodes, wherein the execution platform is independent of the plurality of shared storage devices and the compute service manager. The compute service manager is configured to receive an indication that a data modification task has been executed on a table of the database by one or more execution nodes of the execution platform and determine whether the table is sufficiently clustered. The compute service manager is configured to, in response to determining the table is not sufficiently clustered, select one or more micro-partitions of the table to be reclustered. The compute service manager is configured to assign each of the one or more micro-partitions to an execution node to be reclustered.

Example 45 is a system as in Example 44, wherein the compute service manager is configured to determine whether the table is sufficiently clustered by assessing the data modification task to determine whether a sufficient number of rows has been added, a sufficient number of rows has been deleted, and/or a sufficient number of rows has been modified to necessitate the table be reclustered.

Example 46 is a system as in any of Examples 44-45, wherein the compute service manager is configured to select one or more micro-partitions of the table to be reclustered by: identifying a constant micro-partition having equivalent minimum and maximum values for a cluster key column; and removing the constant micro-partition from consideration such that the constant micro-partition is not included in the one or more micro-partitions to be reclustered.

Example 47 is a system as in any of Examples 44-46, wherein the compute service manager is configured to select the one or more micro-partitions of the table to be reclustered by: constructing a stabbing count array for the table; extracting minimum and maximum endpoints for each micro-partition in the stabbing count array; computing statistics on each of the minimum and maximum endpoints; and identifying one or more peaks in the stabbing count array that are taller than a predefined threshold.

Example 48 is a system as in any of Examples 44-47, wherein the computer service manager is configured to select the one or more micro-partitions of the table to be reclustered further by: sorting each of the one or more peaks in the stabbing count array based on height; identifying overlapping micro-partitions within each of the one or more peaks; and sorting the overlapping micro-partitions based on width.

Example 49 is a system as in any of Examples 44-48, wherein the compute service manager is configured to select the one or more micro-partitions of the table to be reclustered further comprises selecting based on which micro-partitions are within the tallest peaks of the one or more peaks and further based on which of the overlapping micro-partitions have the widest widths.

Example 50 is a system as in any of Examples 44-49, wherein the compute service manager is further configured to define a budget for allocating processing resources to performing reclustering operations, and wherein the determining whether the table is sufficiently clustered is based at least in part on the budget.

Example 51 is a system as in any of Examples 44-50, wherein the compute service manager is further configured to partition the one or more micro-partitions of the table to be reclustered into one or more batches each comprising a grouping of micro-partitions to be reclustered.

Example 52 is a system as in any of Examples 44-51, wherein the compute service manager is configured to select the one or more micro-partitions of the table to be reclustered by: determining a maximum number of levels for the table based at least on a size of the table; dividing the table into levels; selecting a macro-batch of micro-partitions within each level, wherein the macro-batch centers around a single peak and comprises defined boundaries; and selecting micro-partitions from the macro-batch.

Example 53 is a system as in any of Examples 44-52, wherein the data modification task comprises ingesting new micro-partitions into the table and wherein the compute service manager is configured to determine whether the table is sufficiently clustered by: retrieving level information for the table; identifying a proportion of micro-partitions in lower levels of the table; determining whether a high proportion of micro-partitions are in the lower levels; in response to determining a high proportion of micro-partitions are not in the lower levels, entering a stable mode in which no reclustering operations will not be performed; and in response to determining a high proportion of micro-partitions are in the lower levels, entering a catch-up mode in which reclustering operations will be performed.

Example 54 is a processor configurable to execute instructions stored in non-transitory computer readable storage media. The instructions include receiving an indication that a data modification task has been executed on a table and determining whether the table is sufficiently clustered. The instructions include, in response to determining the table is not sufficiently clustered, selecting one or more micro-partitions of the table to be reclustered. The instructions include assigning each of the one or more micro-partitions to an execution node to be reclustered.

Example 55 is a processor as in Example 54, wherein determining whether the table is sufficiently clustered comprises assessing the data modification task to determine whether a sufficient number of rows has been added, a sufficient number of rows has been deleted, and/or a sufficient number of rows has been modified to necessitate the table be reclustered.

Example 56 is a processor as in any of Examples 54-55, wherein selecting one or more micro-partitions of the table to be reclustered comprises: identifying a constant micro-partition having equivalent minimum and maximum values for a cluster key column; and removing the constant micro-partition from consideration such that the constant micro-partition is not included in the one or more micro-partitions to be reclustered.

Example 57 is a processor as in any of Examples 54-56, wherein selecting the one or more micro-partitions of the table to be reclustered comprises: constructing a stabbing count array for the table; extracting minimum and maximum endpoints for each micro-partition in the stabbing count array; computing statistics on each of the minimum and maximum endpoints; identifying one or more peaks in the stabbing count array that are taller than a predefined threshold; sorting each of the one or more peaks in the stabbing count array based on height; identifying overlapping micro-partitions within each of the one or more peaks; and sorting the overlapping micro-partitions based on width.

Example 58 is a processor as in any of Examples 54-57, wherein selecting the one or more micro-partitions of the table to be reclustered further comprises selecting based on which micro-partitions are within the tallest peaks of the one or more peaks and further based on which of the overlapping micro-partitions have the widest widths.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method comprising:
   receiving an indication that a data modification task has been executed on a table, the data modification task comprising ingesting new micro-partitions into the table;
   determining, subsequent to the execution of the data modification task on the table, that the table is not sufficiently clustered, the determining comprising:
   retrieving level information for the table;
   identifying, based on the retrieved level information, a proportion of micro-partitions in lower levels of the table; and
   determining that the identified proportion of micro-partitions in lower levels of the table exceeds a threshold, and responsively entering a catch-up mode in which reclustering operations are performed;
   selecting one or more micro-partitions of the table to be reclustered; and
   reclustering the one or more selected micro-partitions.

2. The method of claim 1, wherein determining that the table is not sufficiently clustered comprises determining one or more of:
   at least a threshold number of rows was added to the table by the execution of the data modification task on the table;
   at least a threshold number of rows was deleted from the table by the execution of the data modification task on the table; and
   at least a threshold number of rows was modified in the table by the execution of the data modification task on the table.

3. The method of claim 1, wherein selecting one or more micro-partitions of the table to be reclustered comprises:
   identifying a constant micro-partition, the constant micro-partition having equivalent minimum and maximum values for a cluster key column; and
   selecting, as the one or more micro-partitions of the table to be reclustered, one or more micro-partitions of the table other than the identified constant micro-partition.

4. The method of claim 1, further comprising:
   constructing a stabbing count array for the table;
   identifying one or more peaks in the stabbing count array that are taller than a predefined threshold;
   identifying micro-partitions within the one or more identified peaks; and sorting the identified micro-partitions based on width,
wherein selecting the one or more micro-partitions of the table to be reclustered comprises selecting a subset of the identified micro-partitions having the greatest widths.

5. The method of claim 4, further comprising:
sorting each of the one or more identified peaks in the stabbing count array based on height,
wherein identifying micro-partitions within the one or more identified peaks comprises identifying micro-partitions within a subset of the one or more identified peaks having the greatest heights.

6. The method of claim 1, further comprising defining a budget for allocating processing resources to performing reclustering operations, wherein determining that the table is not sufficiently clustered is based at least in part on the defined budget.

7. The method of claim 1, further comprising partitioning the one or more selected micro-partitions of the table into multiple batches of micro-partitions to be reclustered.

8. The method of claim 1, wherein selecting the one or more micro-partitions of the table to be reclustered comprises:
determining a maximum number of levels for the table based at least on a size of the table;
dividing the table into levels;
selecting a micro-batch of micro-partitions within each level; and
selecting micro-partitions from the micro-batch.

9. The method of claim 1, wherein reclustering the one or more selected micro-partitions comprises assigning each of the one or more selected micro-partitions to an execution node to be reclustered.

10. A system comprising:
at least one processor; and
one or more non-transitory computer readable storage media containing instructions executable by the at least one processor for causing the at least one processor to perform operations comprising:
receiving an indication that a data modification task has been executed on a table, the data modification task comprises ingesting new micro-partitions into the table;
determining, subsequent to the execution of the data modification task on the table, that the table is not sufficiently clustered, the determining comprising:
retrieving level information for the table;
identifying, based on the retrieved level information, a proportion of micro-partitions in lower levels of the table; and
determining that the identified proportion of micro-partitions in lower levels of the table exceeds a threshold, and responsively entering a catch-up mode in which reclustering operations are performed;
selecting one or more micro-partitions of the table to be reclustered; and
reclustering the one or more selected micro-partitions.

11. The system of claim 10, wherein determining that the table is not sufficiently clustered comprises determining one or more of:
at least a threshold number of rows was added to the table by the execution of the data modification task on the table;
at least a threshold number of rows was deleted from the table by the execution of the data modification task on the table; and
at least a threshold number of rows was modified in the table by the execution of the data modification task on the table.

12. The system of claim 10, wherein selecting one or more micro-partitions of the table to be reclustered comprises:
identifying a constant micro-partition, the constant micro-partition having equivalent minimum and maximum values for a cluster key column; and
selecting, as the one or more micro-partitions of the table to be reclustered, one or more micro-partitions of the table other than the identified constant micro-partition.

13. The system of claim 10, the operations further comprising:
constructing a stabbing count array for the table;
identifying one or more peaks in the stabbing count array that are taller than a predefined threshold;
identifying micro-partitions within the one or more identified peaks; and
sorting the identified micro-partitions based on width,
wherein selecting the one or more micro-partitions of the table to be reclustered comprises selecting a subset of the identified micro-partitions having the greatest widths.

14. The system of claim 13, the operations further comprising:
sorting each of the one or more identified peaks in the stabbing count array based on height,
wherein identifying micro-partitions within the one or more identified peaks comprises identifying micro-partitions within a subset of the one or more identified peaks having the greatest heights.

15. The system of claim 10, the operations further comprising defining a budget for allocating processing resources to performing reclustering operations, wherein determining that the table is not sufficiently clustered is based at least in part on the defined budget.

16. The system of claim 10, the operations further comprising partitioning the one or more selected micro-partitions of the table into multiple batches of micro-partitions to be reclustered.

17. The system of claim 10, wherein selecting the one or more micro-partitions of the table to be reclustered comprises:
determining a maximum number of levels for the table based at least on a size of the table;
dividing the table into levels;
selecting a micro-batch of micro-partitions within each level; and
selecting micro-partitions from the micro-batch.

18. The system of claim 10, wherein reclustering the one or more selected micro-partitions comprises assigning each of the one or more selected micro-partitions to an execution node to be reclustered.

19. One or more non-transitory computer readable storage media containing instructions executable by at least one processor for causing the at least one processor to perform operations comprising:
receiving an indication that a data modification task has been executed on a table, the data modification task comprises ingesting new micro-partitions into the table;

determining, subsequent to the execution of the data modification task on the table, that the table is not sufficiently clustered, the determining comprising:

retrieving level information for the table;

identifying, based on the retrieved level information, a proportion of micro-partitions in lower levels of the table; and determining that the identified proportion of micro-partitions in lower levels of the table exceeds a threshold, and responsively entering a catch-up mode in which reclustering operations are performed;

selecting one or more micro-partitions of the table to be reclustered; and reclustering the one or more selected micro-partitions.

20. The non-transitory computer readable storage media of claim 19, wherein determining that the table is not sufficiently clustered comprises determining one or more of:

at least a threshold number of rows was added to the table by the execution of the data modification task on the table;

at least a threshold number of rows was deleted from the table by the execution of the data modification task on the table; and at least a threshold number of rows was modified in the table by the execution of the data modification task on the table.

21. The non-transitory computer readable storage media of claim 19, wherein selecting one or more micro-partitions of the table to be reclustered comprises:

identifying a constant micro-partition, the constant micro-partition having equivalent minimum and maximum values for a cluster key column; and selecting, as the one or more micro-partitions of the table to be reclustered, one or more micro-partitions of the table other than the identified constant micro-partition.

22. The non-transitory computer readable storage media of claim 19, the operations further comprising:

constructing a stabbing count array for the table;

identifying one or more peaks in the stabbing count array that are taller than a predefined threshold;

identifying micro-partitions within the one or more identified peaks; and sorting the identified micro-partitions based on width, wherein selecting the one or more micro-partitions of the table to be reclustered comprises selecting a subset of the identified micro-partitions having the greatest widths.

23. The non-transitory computer readable storage media of claim 22, the operations further comprising:

sorting each of the one or more identified peaks in the stabbing count array based on height, wherein identifying micro-partitions within the one or more identified peaks comprises identifying micro-partitions within a subset of the one or more identified peaks having the greatest heights.

24. The non-transitory computer readable storage media of claim 19, the operations further comprising defining a budget for allocating processing resources to performing reclustering operations, wherein determining that the table is not sufficiently clustered is based at least in part on the defined budget.

25. The non-transitory computer readable storage media of claim 19, the operations further comprising partitioning the one or more selected micro-partitions of the table into multiple batches of micro-partitions to be reclustered.

26. The non-transitory computer readable storage media of claim 19, wherein selecting the one or more micro-partitions of the table to be reclustered comprises:

determining a maximum number of levels for the table based at least on a size of the table;

dividing the table into levels;

selecting a micro-batch of micro-partitions within each level; and selecting micro-partitions from the micro-batch.

27. The non-transitory computer readable storage media of claim 19, wherein reclustering the one or more selected micro-partitions comprises assigning each of the one or more selected micro-partitions to an execution node to be reclustered.

* * * * *